US009503216B2

(12) United States Patent
Siomina et al.

(10) Patent No.: US 9,503,216 B2
(45) Date of Patent: Nov. 22, 2016

(54) METHODS AND DEVICES RELATED TO EFFECTIVE MEASUREMENTS

(71) Applicant: Telefonaktiebolaget L M Ericsson (publ), Stockholm (SE)

(72) Inventors: Iana Siomina, Solna (SE); Muhammad Kazmi, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 154 days.

(21) Appl. No.: 14/068,159

(22) Filed: Oct. 31, 2013

(65) Prior Publication Data
US 2014/0128115 A1    May 8, 2014

Related U.S. Application Data

(60) Provisional application No. 61/721,634, filed on Nov. 2, 2012.

(51) Int. Cl.
*H04L 1/00* (2006.01)
*H04J 11/00* (2006.01)
(Continued)

(52) U.S. Cl.
CPC .......... *H04L 1/0036* (2013.01); *H04J 11/005* (2013.01); *H04L 1/0015* (2013.01); *H04L 1/0026* (2013.01);
(Continued)

(58) Field of Classification Search
USPC ......... 455/500, 434, 522, 456.2, 456.1, 501, 455/67.11, 63.1, 423.4, 423.5, 296, 306,
(Continued)

(56) References Cited

U.S. PATENT DOCUMENTS 6,292,519 B1 *   9/2001   Popovic .................... H04L 1/20
                                                                  375/130
2008/0220806 A1 *   9/2008   Shin ....................... H04W 52/08
                                                                  455/522
(Continued)

FOREIGN PATENT DOCUMENTS

WO    2011097760 A1    8/2011
WO    2011099910 A1    8/2011
WO    2012067467 A2    5/2012

OTHER PUBLICATIONS

Author Unknown, "3rd Generation Partnership Project; Technical Specification Group Radio Access Network; Evolved Universal Terrestrial Radio Access (E-UTRA); Requirements for support of radio resource management (Release 11)," Technical Specification 36.133, Version 11.2.0, 3GPP Organizational Partners, Sep. 2012, 672 pages.

(Continued)

*Primary Examiner* — Ganiyu A Hanidu
(74) *Attorney, Agent, or Firm* — Withrow & Terranova, PLLC

(57) ABSTRACT

Systems and methods related to effective measurements in a cellular communications network are disclosed. In one embodiment, a network node obtains a reference measurement performed by a measuring node, where the reference measurement contains one or more interference components. The reference measurement may be, for instance, a reference signal quality measurement or a reference signal power measurement. The network node then mitigates at least one of the interference components contained in the reference measurement to thereby provide an effective measurement for the measuring node. In one embodiment, the network node mitigates the at least one interference component by obtaining a compensation value for mitigating the at least one interference component and applying the compensation value to the reference measurement to thereby provide the effective measurement.

42 Claims, 10 Drawing Sheets

(51) Int. Cl.
*H04W 52/24* (2009.01)
*H04W 24/10* (2009.01)
H04W 84/04 (2009.01)
H04B 17/318 (2015.01)
H04B 17/327 (2015.01)

(52) U.S. Cl.
CPC ........... *H04W 24/10* (2013.01); *H04W 52/244* (2013.01); *H04B 17/318* (2015.01); *H04B 17/327* (2015.01); *H04W 84/045* (2013.01)

(58) Field of Classification Search
USPC .. 455/509, 69; 370/336, 252, 343, 332, 328, 370/318, 329, 468, 229, 324, 350; 375/220, 375/222, 259, 275, 148, 371, 285, 260, 375/227.144, 376
See application file for complete search history.

(56) References Cited

U.S. PATENT DOCUMENTS

| | | | |
|---|---|---|---|
| 2009/0147892 A1 | 6/2009 | Lee et al. | |
| 2011/0217985 A1 | 9/2011 | Gorokhov | |
| 2011/0281601 A1* | 11/2011 | Ahn et al. | 455/500 |
| 2012/0082022 A1 | 4/2012 | Damnjanovic et al. | |
| 2012/0082052 A1* | 4/2012 | Oteri | H04W 24/10 370/252 |
| 2012/0115469 A1* | 5/2012 | Chen | H04W 36/0094 455/434 |
| 2012/0122440 A1 | 5/2012 | Krishnamurthy et al. | |
| 2012/0176923 A1 | 7/2012 | Hsu et al. | |
| 2012/0213096 A1* | 8/2012 | Krishnamurthy | H04L 5/001 370/252 |
| 2012/0213137 A1 | 8/2012 | Jeong et al. | |
| 2012/0214512 A1* | 8/2012 | Siomina | G01S 5/0205 455/456.2 |
| 2013/0023285 A1* | 1/2013 | Markhovsky | G01S 3/74 455/456.1 |
| 2013/0094381 A1 | 4/2013 | Han et al. | |
| 2013/0225188 A1 | 8/2013 | Seo et al. | |
| 2013/0336149 A1 | 12/2013 | Ishii et al. | |
| 2014/0029586 A1* | 1/2014 | Loehr | H04W 56/0045 370/336 |
| 2014/0126403 A1 | 5/2014 | Siomina | |
| 2015/0043363 A1 | 2/2015 | Koskinen et al. | |

OTHER PUBLICATIONS

Author Unknown, "3rd Generation Partnership Project; Technical Specification Group Radio Access Network; Evolved Universal Terrestrial Radio Access (E-UTRA); Physical Channels and Modulation (Release 11)," Technical Specification 36.211, Version 11.0.0, 3GPP Organizational Partners, Sep. 2012, 106 pages.

Author Unknown, "3rd Generation Partnership Project; Technical Specification Group Radio Access Network; Evolved Universal Terrestrial Radio Access (E-UTRA); Physical layer; Measurements (Release 11)," Technical Specification 36.214, Version 11.0.0, 3GPP Organizational Partners, Sep. 2012, 14 pages.

Author Unknown, "Technical Specification Group Radio Access Network; Evolved Universal Terrestrial Radio Access (E-UTRA); Radio Resource Control (RRC); Protocol specification (Release 11)," Technical Specification 36.331, Version 11.1.0, 3GPP Organizational Partners, Sep. 2012, 325 pages.

Author Unknown, "3rd Generation Partnership Project; Technical Specification Group Radio Access Network; Evolved Universal Terrestrial Radio Access Network (E-UTRAN); X2 application protocol (X2AP) (Release 11)," Technical Specification 36.423, Version 11.2.0, 3GPP Organizational Partners, Sep. 2012, 136 pages.

International Search Report and Written Opinion for PCT/IB2013/059855, mailed Mar. 25, 2014, 10 pages.

International Search Report and Written Opinion for PCT/IB2013/059859, mailed Mar. 25, 2014, 10 pages.

Non-Final Office Action and Examiner-Initiated Interview Summary for U.S. Appl. No. 14/068,817, mailed Jul. 16, 2015, 26 pages.

Final Office Action and Examiner-Initiated Interview Summary for U.S. Appl. No. 14/068,817, mailed Jan. 21, 2016, 22 pages.

International Preliminary Report on Patentability for International Patent Application No. PCT/IB2013/059855, mailed May 14, 2015, 8 pages.

Notice of Allowance and AFCP 2.0 Decision for U.S. Appl. No. 14/068,817, mailed Apr. 6, 2016, 9 pages.

Mediatek Inc., "R4-125373: Link level simulation results on feICIC CRS-IC receiver," 3rd Generation Partnership Project (3GPP), TSG-RAN WG4 Meeting #64bis, Oct. 8-12, 2012, 6 pages, Santa Rosa, USA.

Notice of Reasons for Rejection for Japanese Patent Application No. 2014-540258, issued Aug. 2, 2016, 6 pages.

\* cited by examiner

METHODS AND DEVICES RELATED TO EFFECTIVE MEASUREMENTS

RELATED APPLICATIONS

This application claims the benefit of provisional patent application Ser. No. 61/721,634, filed Nov. 2, 2012, the disclosure of which is hereby incorporated herein by reference in its entirety.

This application is related to commonly owned and assigned U.S. patent application Ser. No. 14/068,817, entitled METHODS OF OBTAINING MEASUREMENTS IN THE PRESENCE OF STRONG AND/OR HIGHLY VARYING INTERFERENCE, which was filed Oct. 31, 2013, and was assigned U.S. Pat. No. 9,398,480, and is hereby incorporated herein by reference in its entirety.

FIELD OF THE DISCLOSURE

The present disclosure relates to wireless communications networks and in particular to mitigating effects of interference in measurements.

BACKGROUND

With regards to cellular communications networks, interest in deploying low-power nodes (e.g., pico base stations, Home eNodeBs (HeNBs), relays, Remote Radio Heads (RRHs), etc.) for enhancing macro network performance in terms of network coverage, capacity, and service experience of individual users has been constantly increasing over the last few years. At the same time, there is a need for enhanced interference management techniques to address new interference issues resulting from these low-power nodes such as, for example, interference caused by a significant transmit power variation among different cells and interference caused by existing cell association techniques, which were developed for more uniform cellular communications networks.

In $3^{rd}$ Generation Partnership Project (3GPP), heterogeneous network deployments have been defined as deployments where low-power nodes of different transmit powers are placed throughout a macro cell layout. This also implies non-uniform traffic distribution. Heterogeneous network deployments are, for example, effective for capacity extension in certain areas, which are often referred to as traffic hotspots. The traffic hotspots are more specifically small geographical areas with high user density and/or high traffic intensity where installation of low-power nodes can be deployed to enhance performance. Heterogeneous network deployments may also be viewed as a way of densifying networks to adapt for traffic needs and the environment. However, heterogeneous network deployments also bring new challenges for which the cellular communications network has to be prepared to ensure efficient network operation and superior user experience. Some of these challenges are related to increased interference in the attempt to increase small cells associated with low-power nodes, which is known as cell range expansion. Other challenges are related to potentially high interference in the uplink due to a mix of large and small cells.

More specifically, as illustrated in FIG. 1, according to 3GPP, a heterogeneous cellular communications network 10 includes a number of macro, or high-power, base stations 12 forming a macro cell layout and a number of low-power base stations 14 placed throughout the macro cell layout. For Long Term Evolution (LTE), the macro base stations 12 are referred to as Evolved Node Bs (eNBs). The low-power base stations 14 are sometimes referred to as pico base stations (serving pico cells), femto base stations (serving femto cells), HeNBs, or the like. Interference characteristics in a heterogeneous network deployment, such as the heterogeneous cellular communications network 10, for the downlink, uplink, or both the downlink and the uplink can be significantly different than in a homogeneous deployment.

Some examples of new interference scenarios that may be present in the heterogeneous cellular communications network 10 are illustrated in FIG. 1 and are indicated as interference scenarios (A), (B), (C), and (D). In interference scenario (A), a User Equipment (UE) 16 is served by the macro base station 12 and has no access to a nearby Closed Subscriber Group (CSG) cell served by one of the low-power base stations 14. As a result, downlink transmissions by the low-power base station 14 for the CSG cell will result in downlink interference at the UE 16. In interference scenario (B), a UE 18 is served by the macro base station 12 and has no access to a nearby CSG cell served by one of the low-power base stations 14. As a result, uplink transmissions by the UE 18 result in severe uplink interference towards the nearby low-power base station 14. In interference scenario (C), a UE 20 connected to a first CSG cell served by one of the low-power base stations 14 receives downlink interference from another low-power base station 14 serving a second CSG cell. Lastly, in interference scenario (D) a UE 22 is served by a pico cell of one of the low-power base stations 14 and is located in an expanded cell range area (i.e., a Cell Range Expansion (CRE) zone) of the pico cell. In this case, the UE 22 will receive higher downlink interference from the macro base station 12. Note that while CSGs are used in many of the examples above, a heterogeneous network deployment does not necessarily involve CSG cells.

Another challenging interference scenario occurs with cell range expansion. With cell range expansion, the traditional downlink cell assignment rule diverges from the Reference Signal Received Power (RSRP)-based approach, e.g. towards path loss or path gain based approach, e.g. when adopted for cells with a transmit power lower than neighbor cells. The idea of the cell range expansion is illustrated in FIG. 2, which generally illustrates a macro base station 24 and a pico base station 26. As illustrated, cell range expansion of a pico cell served by the pico base station 26 is implemented by means of a delta-parameter. A UE 28 can potentially see a larger pico cell coverage area when the delta-parameter is used in cell selection/reselection. The cell range expansion is limited by the downlink performance since uplink performance typically improves when the cell sizes of neighbor cells become more balanced.

To ensure reliable and high bitrate transmissions as well as robust control channel performance, a good signal quality must be maintained in a cellular communications network. The signal quality of a signal received by a receiver is determined by a received signal strength for the signal and a relation of the received signal strength to a total interference and noise received by the receiver. A good network plan, which among other things also includes cell planning, is a prerequisite for successful network operation. However, the network plan is static. For more efficient radio resource utilization, the network plan has to be complemented by at least semi-static and dynamic radio resource management mechanisms, which are also intended to facilitate interference management, and more advanced antenna technologies and algorithms.

One way to handle interference is to, for example, adopt more advanced transceiver technologies, e.g. by implementing interference cancellation mechanisms in UEs. Another way, which can be complementary to the former, is to design efficient interference coordination algorithms and transmission schemes in the cellular communications network. The coordination may be realized in a static, semi-static, or dynamic fashion. Static or semi-static schemes may rely on reserving time-frequency resources (e.g., a part of the bandwidth and/or time instances) that are orthogonal for strongly interfering transmissions. Dynamic coordination may be implemented by, for example, means of scheduling. Such interference coordination may be implemented for all or specific channels (e.g., data channels or control channels) or signals.

Specifically, for heterogeneous network deployments, enhanced Inter-Cell Interference Coordination (eICIC) mechanisms have been standardized for ensuring that the UE performs at least some measurements (e.g., Radio Resource Management (RRM), Radio Link Management (RLM), and Channel State Information (CSI) measurements) in low-interference subframes of the interfering cell. These mechanisms involve configuring patterns of low-interference subframes at transmitting nodes (and thereby reducing interference) and configuring measurement patterns for UEs (and thereby indicating to the UEs low-interference measurement occasions).

Two types of patterns have been defined for eICIC in LTE Release 10 to enable restricted measurements in the downlink, namely: (1) restricted measurement patterns, which are configured by a network node and signaled to the UE, and (2) transmission patterns (also known as Almost Blank Subframe (ABS) patterns), which are configured by a network node, that describe the transmission activity of a radio node and may be exchanged between radio nodes.

Regarding restricted measurement patterns for the downlink, restricted measurements for RRM (e.g., RSRP/Reference Signal Received Quality (RSRQ)), RLM, CSI, as well as for demodulation are enabled by Radio Resource Control (RRC) UE-specific signaling of the following pattern sets to the UE as specified in 3GPP Technical Specification (TS) 36.331 V10.1.0:

Pattern 1: A single RRM/RLM measurement resource restriction for the serving cell, Pattern 2: One RRM measurement resource restriction for neighbor cells (up to 32 cells) per frequency (currently only for the serving frequency), and Pattern 3: Resource restriction for CSI measurement of the serving cell with two subframe subsets configured per UE.

A pattern is a bit string indicating restricted and unrestricted subframes characterized by a length and periodicity, which are different for Frequency Division Duplexing (FDD) and Time Division Duplexing (TDD) (40 subframes for FDD and 20, 60, or 70 subframes for TDD). Restricted measurement subframes are configured to allow the UE to perform measurements in subframes with improved interference conditions, which may be implemented by configuring ABS patterns at the appropriate base stations.

In addition to RRM/RLM, Pattern 1 may also be used to enable UE Receive (Rx)-Transmit (Tx) measurements in low-interference conditions or in principle for any Cell-Specific Reference Signal (CRS)-based measurement to improve the measurement performance when strong interference may be reduced by configuring low-interference subframes. Pattern 3 would typically be used for enhancing channel quality reporting and improving the performance of channel demodulation and decoding (e.g., of data channels such as Physical Downlink Shared Channel (PDSCH) and/or control channels such as Physical Downlink Control Channel (PDCCH), Physical Control Format Indicator Channel (PCFICH), and Physical Hybrid Automatic Repeat Request (HARQ) Indicator Channel (PHICH)). Pattern 1 and Pattern 2 may also be used for enabling low-interference conditions for common signals (e.g., Primary Synchronization Signal (PSS)/Secondary Synchronization Signal (SSS)), common channels, and broadcast/multicast channels (e.g., Physical Broadcast Channel (PBCH)) when strong interference can be reduced or avoided (e.g., when a time shift is applied to ensure that the common channels/signals are interfered with by data transmissions whose interference may be avoided by configuring low-interference subframes and thereby suppressing the interfering data transmissions).

An ABS pattern indicates subframes when a base station restricts its transmissions (e.g., does not schedule transmissions or transmits at a lower power). The subframes with restricted transmissions are referred to as ABS subframes. In the current LTE standard, base stations can suppress data transmissions in ABS subframes, but the ABS subframes cannot be fully blank, i.e., at least some of the control channels and physical signals are still transmitted. Examples of control channels that are transmitted in ABS subframes even when no data is transmitted are PBCH and PHICH. Examples of physical signals that have to be transmitted, regardless of whether the subframes are ABS or not, are CRS and synchronization signals (PSS and SSS). Positioning Reference Signals (PRS) may also be transmitted in ABS subframes. If a Multicast-Broadcast Single-Frequency Network (MBSFN) subframe coincides with an ABS subframe, the subframe is also considered as an ABS subframe, as specified in 3GPP TS 36.423. CRS are not transmitted in MBSFN subframes, except for the first symbol, which allows for avoiding CRS interference from an aggressor cell to the data region of a measured cell. ABS patterns may be exchanged between base stations (e.g., via base station to base station communication, which is referred to as X2 communication in LTE). However, in LTE, the ABS patterns are not signaled to the UE.

In LTE Release 11, for enhanced receivers (e.g., receivers capable of performing an interference handling technique), information about a strongly interfering cell (also known as an aggressor cell) may be provided to facilitate handling of strong interference generated by transmissions in that cell. More specifically, the following information about the interfering cells may be provided to the UE: Physical Cell Identify (PCI), number of CRS antenna ports, and MBSFN subframe configuration. In particular, LTE Release 11 defines the information that may be provided to a UE about an interfering, or aggressor, cell as:

```
NeighCellsCRS-Info-r11 ::=          CHOICE {
    release                             NULL,
    setup                               CRS-
        AssistanceInfoList-r11
}
CRS-AssistanceInfoList-r11 ::= SEQUENCE (SIZE (1..
    maxCellReport)) OF CRS-AssistanceInfo
CRS-AssistanceInfo ::= SEQUENCE {
    physCellId-r11                      PhysCellId,
    antennaPortsCount-r11               ENUMERATED
        {an1, an2, an4, spare1},
    mbsfn-SubframeConfigList-r11        MBSFN-
        SubframeConfigList
}
```

In Universal Mobile Telecommunications System (UMTS)/High Speed Downlink Packet Access (HSDPA), several interference aware receivers have been specified for the UE. These interference aware receivers are referred to as "enhanced receivers" as opposed to the baseline receiver (rake receiver). The UMTS enhanced receivers are referred to as enhanced receiver type 1 (with two branch receiver diversity), enhanced receiver type 2 (with single-branch equalizer), enhanced receiver type 3 (with two branch receiver diversity and equalizer), and enhanced receiver type 3i (with two branch receiver diversity and inter-cell interference cancellation capability). The enhanced receivers can be used to improve performance, e.g. in terms of throughput and/or coverage.

In LTE Release 10, enhanced interference coordination techniques have been developed to mitigate potentially high interference, e.g. in a CRE zone, while providing the UE with time-domain measurement restriction information. Further, for LTE Release 11, advanced receivers based on Minimum Mean Square Error-Interference Rejection Combining (MMSE-IRC) with several covariance estimation techniques and interference-cancellation-capable receivers are currently being studied. In the future, even more complex advanced receivers such as advanced receivers based on Minimum Mean Square Error-Successive Interference Cancellation (MMSE-SIC), which is capable of performing nonlinear subtractive-type interference cancellation, may be used to further enhance system performance.

Such enhanced or advanced receiver techniques generally may benefit all deployments where relatively high interference of one or more signals is experienced when performing measurements on radio signals or channels transmitted by radio nodes or devices, but are particularly useful in heterogeneous network deployments. However, these techniques involve additional complexity, e.g., may require more processing power and/or more memory. Due to these factors, a UE equipped with an enhanced or advanced receiver may only use the interference handling technique(s) (i.e., the interference mitigating feature(s)) of the receiver only on specific signals or channels. For example, a UE may apply an interference mitigation or cancellation technique only on the data channel. In another example, a more sophisticated UE may apply interference mitigation on the data channel as well as on one or two common control signals. Examples of common control signals are reference signals, synchronization signals, and the like.

It should be noted that the terms "enhanced receiver" and "advanced receiver" are used interchangeably herein. Further, an enhanced, or advanced, receiver may also be referred to herein as an interference mitigation receiver, an interference cancellation receiver, an interference suppression receiver, an interference rejection receiver, an interference aware receiver, an interference avoidance receiver, or the like. In general, an enhanced, or advanced, receiver is a receiver capable of improving performance by performing one or more interference handling techniques to fully or partly eliminate interference arising from at least one interference source. The interference is generally the strongest interference signal(s) from an interference source(s), where the strongest interference signal(s) are generally interference signal(s) from a neighboring cell(s). Further, the interference handling technique(s) performed by the enhanced, or advanced, receiver may include, for example, interference cancellation, interference suppression, puncturing or interference rejection combining, or the like, or any combination thereof. Hereinafter, the term "enhanced receiver" is utilized to refer to all variants of an enhanced, or advanced, receiver.

In order to measure a quality of a received signal, LTE has standardized the following UE power-based measurements:
- received signal strength (i.e., RSRP) and quality (i.e., RSRQ),
- inter-Radio Access Technology (RAT) Universal Terrestrial Radio Access (UTRA) received signal strength and quality,
- inter-RAT Global System for Mobile Communications (GSM) received signal strength, and
- inter-RAT Code Division Multiple Access (CDMA) 2000 received signal strength.

These measurements are discussed below in more detail. The RSRQ measurement definition has been additionally adapted in scenarios with high aggressor interference to better reflect interference conditions in subframes indicated for measurements (i.e., when eICIC is used when measurement resource restriction patterns are configured). Other signal measurements are also discussed below.

In regard to measurements without eICIC, RSRP and RSRQ are two intra-RAT measurements of signal power and quality, respectively. In LTE, RSRP is defined as a linear average over power contributions (in Watts) of resource elements that carry cell-specific reference signals within a considered measurement frequency bandwidth. The cell-specific reference signals R0 according 3GPP TS 36.211 are used for RSRP determination. If the UE can reliably detect that R1 is available, the UE may use R1 in addition to R0 to determine RSRP. The reference point for RSRP measurement is the antenna connector of the UE. If receiver diversity is in use by the UE, the reported RSRP value is not to be lower than the corresponding RSRP of any of the individual diversity branches. The RSRP measurement is applicable for RRC_IDLE intra-frequency, RRC_IDLE inter-frequency, RRC_CONNECTED intra-frequency, and RRC_CONNECTED inter-frequency. Therefore, the UE should be capable of using RSRP in all these RRC states and measurement scenarios.

In LTE, RSRQ is defined as a ratio N×RSRP/(Evolved Universal Terrestrial Radio Access (E-UTRA) carrier Received Signal Strength Indocator (RSSI)), where N is the number of resource blocks of the E-UTRA carrier RSSI measurement bandwidth. The measurements in the numerator and denominator are made over the same set of resource blocks. E-UTRA carrier RSSI comprises a linear average of a total received power (in Watts) observed only in Orthogonal Frequency Division Multiplexing (OFDM) symbols containing reference symbols for antenna port 0 in the measurement bandwidth over a number N of resource blocks by the UE from all sources, including co-channel serving and non-serving cells, adjacent channel interference, thermal noise, etc. The reference point for RSRQ measurements is the antenna connector of the UE. If receiver diversity is in use by the UE, the reported RSRP value is not to be lower than the corresponding RSRQ of any of the individual diversity branches. The RSRP measurement is applicable for RRC_IDLE intra-frequency, RRC_IDLE inter-frequency, RRC_CONNECTED intra-frequency, and RRC_CONNECTED inter-frequency. Therefore, the UE should be capable of using RSRP in all these RRC states and measurement scenarios.

Whereas RSRP and RSRQ are two intra-RAT measurements without eICIC, UTRA FDD Common Pilot Channel (CPICH) Received Signal Code Power (RSCP), UTRA FDD Secondary Pilot Channel (SPICH) Energy per Chip/Noise Spectral Density (Ec/No), GSM carrier RSSI, UTRA TDD Primary Common Control Physical Channel (P-CCPCH) RSCP, CDMA2000 1× Round Trip Time (RTT) Pilot Strength, and CDMA2000 High Rate Packet Data (HRPD) Pilot Strength are inter-RAT measurements without eICIC.

More specifically, UTRA FDD CPICH RSCP is the received power on one code measured on the Primary CPICH. The reference point for the RSCP is the antenna connector of the UE. If Tx diversity is applied on the Primary CPICH, the received code power from each antenna is separately measured and summed together in Watts to a total received code power on the Primary CPICH. If receiver diversity is in use by the UE, the reported value is not to be lower than the corresponding CPICH RSCP of any of the individual receive antenna branches. The UTRA FDD CPICH RSCP measurement is applicable for RRC_IDLE inter-RAT and RRC_CONNECTED inter-RAT. Therefore, the UE should be capable of using UTRA FDD CPICH RSCP in all these RRC states and measurement scenarios.

UTRA FDD CPICH Ec/No is the received energy per chip divided by the power density in the band. If receiver diversity is not in use by the UE, the CPICH Ec/No is identical to CPICH RSCP/UTRA Carrier RSSI. Measurement is performed on the Primary CPICH. The reference point for the CPICH Ec/No is the antenna connector of the UE. If Tx diversity is applied on the Primary CPICH, the received energy per chip (Ec) from each antenna is separately measured and summed together in Watts to a total received chip energy per chip on the Primary CPICH, before calculating the Ec/No. If receiver diversity is in use by the UE, the measured CPICH Ec/No value is not to be lower than the corresponding CPICH RSCPi/UTRA Carrier RSSIi of receive antenna branch i. The UTRA FDD CPICH Ec/No measurement is applicable for RRC_IDLE inter-RAT and RRC_CONNECTED inter-RAT. Therefore, the UE should be capable of using UTRA FDD CPICH Ec/No in all these RRC states and measurement scenarios.

GSM carrier RSSI is a RSSI for the wide-band received power within the relevant channel bandwidth. Measurement is performed on a GSM Broadcast Control Channel (BCCH) carrier. The reference point for the RSSI is the antenna connector of the UE. The GSM carrier RSSI measurement is applicable for RRC_IDLE inter-RAT and RRC_CONNECTED inter-RAT. Therefore, the UE should be capable of using GSM carrier RSSI in all these RRC states and measurement scenarios.

UTRA TDD P-CCPCH RSCP is defined as the received power on P-CCPCH of a neighbor UTRA TDD cell. The reference point for the RSCP is the antenna connector of the UE. The UTRA TDD P-CCPCH RSCP measurement is applicable for RRC_IDLE inter-RAT and RRC_CONNECTED inter-RAT. Therefore, the UE should be capable of using UTRA TDD P-CCPCH RSCP in all these RRC states and measurement scenarios.

CDMA2000 1×RTT Pilot Strength is defined in section 5.1.10 of 3GPP TS 36.214 v11.0.0. CDMA2000 HRPD Pilot Strength is defined in section 5.1.11 of 3GPP TS 36.214 v11.0.0. The CDMA2000 1×RTT Pilot Strength and CDMA2000 HRPD Pilot Strength measurements are applicable for RRC_IDLE inter-RAT and RRC_CONNECTED inter-RAT. Therefore, the UE should be capable of using CDMA2000 1×RTT Pilot Strength and CDMA2000 HRPD Pilot Strength in all these RRC states and measurement scenarios.

The measurements above are made without eICIC. The following measurements are made with eICIC. In the current LTE standard, RSSI measurements with eICIC are averaged over all symbols of a subframe, unlike RSSI measurements without eICIC. Specifically, with eICIC, RSRP is defined as the ratio N×RSRP/(E-UTRA carrier RSSI), where N is the number of resource blocks of the E-UTRA carrier RSSI measurement bandwidth. The measurements in the numerator and denominator are made over the same set of resource blocks. E-UTRA Carrier RSSI comprises the linear average of the total received power (in Watts) observed only in OFDM symbols containing reference symbols for antenna port 0 in the measurement bandwidth over N number of resource blocks by the UE from all sources, including co-channel serving and non-serving cells, adjacent channel interference, thermal noise, etc. With respect to eICIC, if higher-layer signaling indicates certain subframes for performing RSRQ measurements, then RSSI is measured over all OFDM symbols in the indicated subframes. The reference point for the RSRQ is the antenna connector of the UE. If receiver diversity is in use by the UE, the reported value is not to be lower than the corresponding RSRQ of any of the individual diversity branches.

A wideband RSRQ (aka wide bandwidth RSRQ) is similar to the RSRQ described above except that the former (wideband RSRQ) is measured over a measurement bandwidth larger than six resource blocks. That means a wideband RSRQ has to meet requirements corresponding to measurement bandwidth of larger than six resource blocks. The wideband RSRQ is performed by the UE when explicitly indicated by the network, e.g. in some specific deployment scenarios.

The measurements discussed above are generally used for mobility purposes. Other measurements are defined for purposes other than mobility. Some examples are RLM related measurements, CSI measurements, measurements related to signal quality in general, and interference measurements. In regard to RLM related measurements, the UE also performs measurements on the serving cell (or primary cell) in order to monitor the serving cell performance. The performance of these measurements is referred to as RLM, and the measurements are referred herein to as RLM related measurements.

For RLM, the UE monitors the downlink link quality based on the cell-specific reference signal in order to detect the downlink radio link quality of the serving or primary cell. In principle, the downlink link quality can also be monitored also on other types of reference signals, e.g. Demodulation Reference Signal (DMRS), Channel State Information-Reference Signal (CSI-RS), etc. The downlink link quality measurement for RLM purposes incorporates signal strength of the cell-specific reference signal (or any other signal used for measurement) and total received interference. Therefore, RLM measurement is also regarded as a quality measurement.

In order to detect out of sync and in sync conditions, the UE compares the estimated quality with defined thresholds $Q_{out}$ and $Q_{in}$, respectively. The thresholds $Q_{out}$ and $Q_{in}$ are defined as the levels at which the downlink radio link cannot ($Q_{out}$) and can ($Q_{in}$) be reliably received and correspond to 10% and 2% block error rate of a hypothetical PDCCH transmission, respectively. In non-Discontinuous Reception (non-DRX), downlink link quality for out of sync and in sync are estimated over evaluation periods of 200 milliseconds (ms) and 100 ms, respectively. In DRX, downlink link quality for out of sync and in sync are estimated over the same evaluation periods, which scale with the DRX cycle, e.g. a period equal to 20 DRX cycles for DRX cycle greater than 10 ms and up to 40 ms. In non-DRX, the out of sync and in sync statuses are assessed by the UE in every radio frame. In DRX, the out of sync and in sync statuses are assessed by the UE once every DRX.

In addition to filtering on the physical layer (i.e., evaluation period), the UE also applies higher layer filtering based on network configured parameters. This increases the reliability of radio link failure detection and thus avoids unnecessary radio link failure and consequently RRC re-establishment. The higher layer filtering for radio link failure and recovery detection would in general comprise the following network controlled parameters:

hysteresis counters, e.g. N310 and N311 out of sync and in sync counters respectively, and timers, e.g. T310 Radio Link Failure (RLF) timer.

For example the UE starts the timer T310 after N310 consecutive Out-Of-Sync (OOS) detections. The UE stops the timer T310 after N311 consecutive In-Sync (IS) detections. The transmitter power of the UE is turned off within 40 ms after the expiry of the timer T310. Upon expiry of the timer T310, the UE starts the timer T311. Upon expiry of the timer T311, the UE initiates RRC re-establishment phase during which it reselects a new strongest cell. In High Speed Packet Access (HSPA), similar concepts called OOS and IS detection are carried out by the UE. The higher layer filtering parameters (i.e., hysteresis counters and timers) are also used in HSPA. There is also RLF and eventually RRC re-establishment procedures specified in HSPA.

In LTE, CSI measurements are performed and reported by the UE. They are defined to facilitate processes such as, for example, scheduling, link adaptation, selection of antenna transmission mode, etc. CSI measurements are typically performed on CRS that are transmitted in the downlink in every subframe. The network can request both periodic and aperiodic CSI reports from the UE. In LTE Release 8/9, both periodic and aperiodic reports are based on CRS. In LTE Release 10, the CSI report can also be based on CSI-RS, which is used for transmission mode 9. There are three main types of CSI reports in LTE:

Rank Indicator (RI): RI is a recommendation to a base station regarding how many layers in the downlink transmission must be used. The RI is only one value which means that the recommended rank is valid across the whole bandwidth.

Precoder Matrix Indicator (PMI): PMI indicates the recommended precoder matrix that must be used in the downlink transmission. The recommended precoder matrix can be frequency-selective.

Channel Quality Indicator (CQI): CQI shows the highest modulation and coding that can be used for downlink transmission. CQI can be frequency-selective, which means that multiple CQI reports can be sent for different parts of the bandwidth. However, the indication does not explicitly comprise the signal quality metric (e.g., RSRQ).

Regarding signal quality in general, the UE may estimate a signal quality such as Signal-to-Noise Ratio (SNR), Signal-to-Interference-Plus-Noise Ratio (SINR), etc. for various purposes such as for monitoring quality of different physical channels, channel estimation, etc. These measurements are also quality measurements as they incorporate an interference component.

As for interference measurements, currently in LTE, the interference estimated by the UE (e.g., RSSI) is not signaled to the network. However, the interference may be derived from the reported RSRQ and RSRP measurements, if they have been estimated in the same time intervals.

To enhance peak rates within a technology, multi-carrier or carrier aggregation solutions are known. Each carrier in multi-carrier or carrier aggregation system is generally termed as a Component Carrier (CC) or sometimes it is also referred to as a cell. In simple words the CC means an individual carrier in a multi-carrier system. The term Carrier Aggregation (CA) is also called (e.g., interchangeably called) "multi-carrier system," "multi-cell operation," "multi-carrier operation," "multi-carrier" transmission, and/or reception. This means the CA is used for transmission of signaling and data in the uplink and downlink directions. One of the CCs is the Primary Component Carrier (PCC) or simply primary carrier or even anchor carrier. The remaining ones are called Secondary Component Carrier (SCC) or simply secondary carriers or even supplementary carriers. Generally the primary or anchor CC carries the essential UE specific signaling. The PCC exists in both uplink and direction CA. The cellular communications network may assign different primary carriers to different UEs operating in the same sector or cell.

Therefore the UE has more than one serving cell in downlink and/or in the uplink: one primary serving cell and one or more secondary serving cells operating on the PCC and the SCC respectively. The serving cell is interchangeably called a Primary Cell (PCell) or Primary Serving Cell (PSC). Similarly the secondary serving cell is interchangeably called a Secondary Cell (SCell) or Secondary Serving Cell (SSC). Regardless of the terminology, the PCell and the SCell(s) enable the UE to receive and/or transmit data. More specifically the PCell and the SCell exist in the downlink and the uplink for the reception and transmission of data by the UE. The remaining non-serving cells on the PCC and SCC are called neighbor cells.

The CCs belonging to the CA may belong to the same frequency band (aka intra-band CA) or to different frequency band (inter-band CA) or any combination thereof (e.g., two CCs in band A and one CC in band B). Furthermore, the CCs in intra-band CA may be adjacent or non-adjacent in frequency domain (aka intra-band non-adjacent CA). A hybrid CA comprising of any two of intra-band adjacent, intra-band non-adjacent, and inter-band is also possible. Using CA between carriers of different technologies is also referred to as "multi-RAT CA" or "multi-RAT-multi-carrier system" or simply "inter-RAT CA." For example, the carriers from Wideband Code Division Multiple Access (WCDMA) and LTE may be aggregated. Another example is the aggregation of LTE FDD and LTE TDD, which may also be interchangeably called a multi-duplex CA system. Yet another example is the aggregation of LTE and CDMA2000 carriers. For the sake of clarity the CA within the same technology as described can be regarded as "intra-RAT" or simply "single RAT" CA.

The CCs in CA may or may not be co-located in the same site or radio network node (e.g., radio base station, relay, mobile relay, etc.). For instance the CCs may originate (i.e., be transmitted/received) at different locations (e.g., from non-located base stations, or from base stations and RRH, or at Remote Radio Units (RRUs)). The well known examples of combined CA and multi-point communication are Distributed Antenna Systems (DAS), RRH, RRU, Coordinated Multi-Point (CoMP), multi-point transmission/reception, etc. The proposed solutions also apply to the multi-point CA systems but also multi-point systems without CA. The multi-carrier operation may also be used in conjunction with multi-antenna transmission. For example signals on each CC may be transmitted by the eNB to the UE over two or more antennas. The embodiments apply to each CC in CA or combination of CA and CoMP scenario.

The use of enhanced receivers and mixtures of enhanced receivers and conventional receivers in a cellular communications network result in new problems associated with some, if not all, of the measurements discussed above. As such, there is a need for systems and methods for addressing these issues.

SUMMARY

The present disclosure relates to effective measurements in a cellular communications network. In one embodiment, a network node obtains a reference measurement performed by a measuring node, where the reference measurement contains one or more interference components. The reference measurement may be, for instance, a reference signal quality measurement or a reference signal power measurement. The network node then mitigates at least one of the interference components contained in the reference measurement to thereby provide an effective measurement for the measuring node. In one embodiment, the network node mitigates the at least one interference component by obtaining a compensation value for mitigating the at least one interference component and applying the compensation value to the reference measurement to thereby provide the effective measurement.

In one embodiment, the measuring node is equipped with an enhanced receiver capable of mitigating interference at the measuring node such that the one or more interference components contained in the reference measurement performed by the measuring node are one or more residual interference components. In one particular embodiment, the one or more residual interference components are one or more residual interference components remaining after the enhanced receiver applies an interference handling technique. In another particular embodiment, the enhanced receiver is configured to disable an interference handling technique, and the one or more residual interference components are one or more residual interference components resulting, at least in part, from the disabled interference handling technique. The measuring node then mitigates at least one of the residual interference components contained in the reference measurement to thereby provide the effective measurement. In one embodiment, the measuring node equipped with the enhanced receiver is a wireless device equipped with the enhanced receiver.

In one embodiment, the reference measurement is on a first cell and both the one or more residual interference components contained in the reference measurement and the at least one of the reference measurement mitigated to provide the effective measurement include one or more residual interference components received from one or more second cells.

In another embodiment, the network node sends and/or receives capability information related to effective measurements to another node.

In one embodiment, a network node obtains an effective measurement for a measuring node and converts the effective measurement into a reference measurement for the measuring node. In one embodiment, the effective measurement is a measurement generated by applying a compensation value to a reference measurement performed by the measuring node in order to mitigate at least one interference component contained in the reference measurement. The network node then obtains a reverse compensation value and applies the reverse compensation value to the effective measurement to provide a reference measurement for the measuring node.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
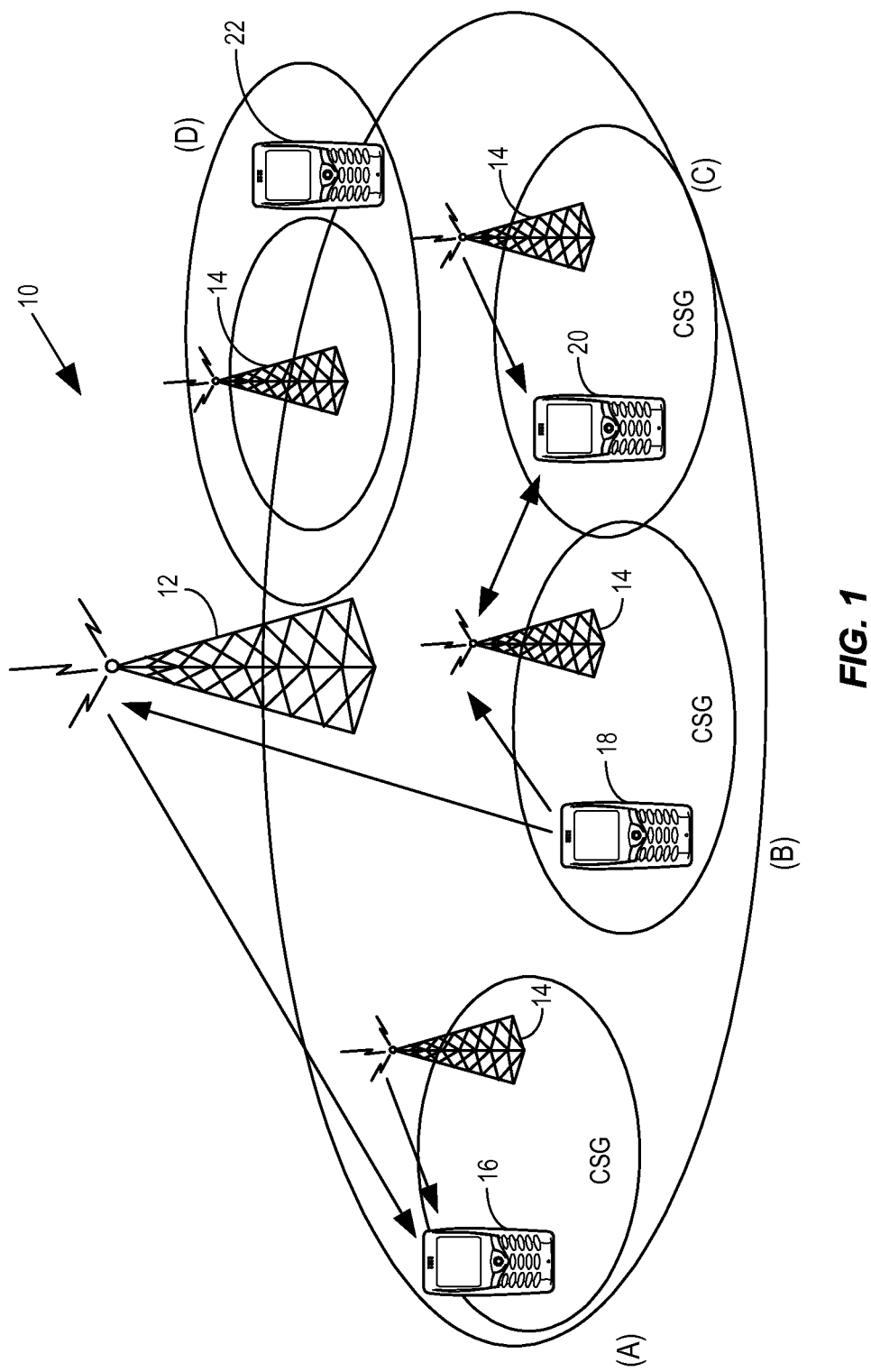
FIG. 1 illustrates a heterogeneous cellular communications network and a number of interference scenarios that may occur in the heterogeneous cellular communications network.
Figure 2:
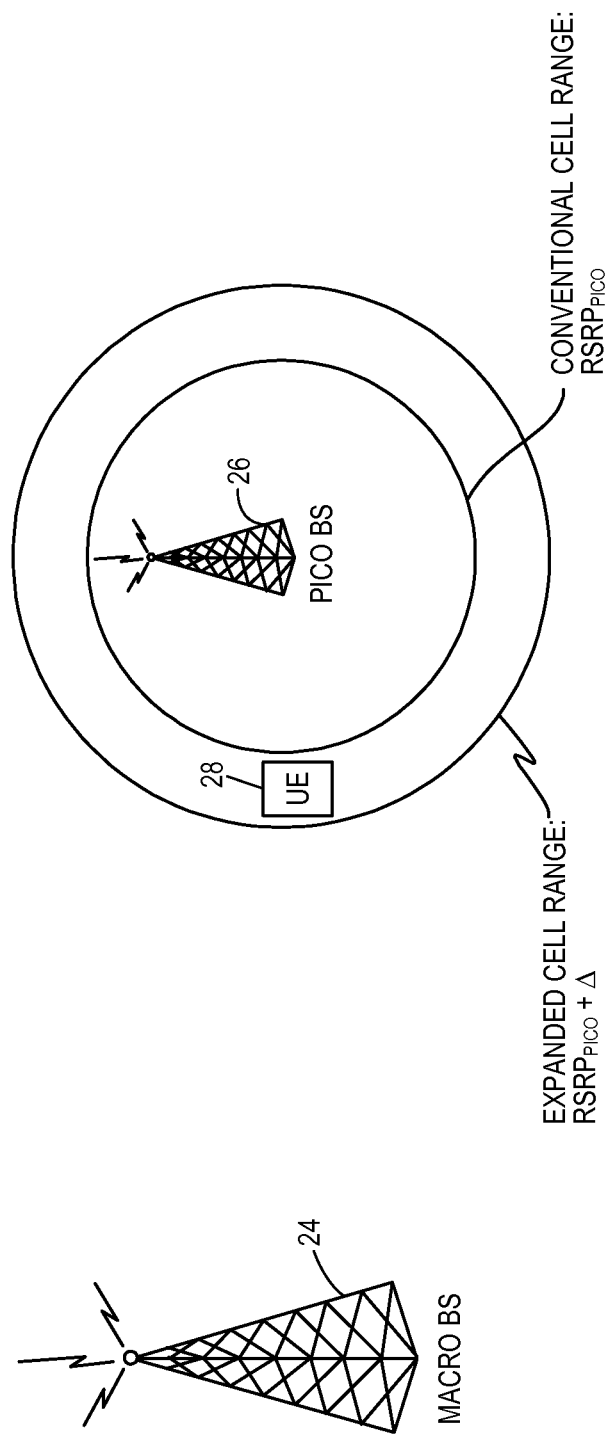
FIG. 2 illustrates cell range expansion of a pico cell in a heterogeneous cellular communications network.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The use of enhanced receivers and mixtures of enhanced receivers and conventional receivers in a cellular communications network result in new problems associated with signal measurements performed by corresponding nodes in a cellular communications network (or other types of wireless networks). For instance, with an enhanced receiver, interference may differ significantly before and after interference handling. Currently in cellular communications standards such as 3$^{rd}$ Generation Partnership Project (3GPP) Long Term Evolution (LTE) and LTE-Advanced, reported measurements do not take into account interference handling. For example, Received Signal Strength Indicator (RSSI) measurements are calculated before interference handling. The same applies for Radio Link Monitoring (RLM) related measurements. The drawback is that a corresponding node equipped with an enhanced receiver (e.g., a wireless device equipped with an enhanced receiver) uses and reports pessimistic signal measurements, rather than measurements that are indicative of the actual conditions at the node after interfering handling by the enhanced receiver. This may degrade the quality of radio link monitoring, handover, pathloss estimation, power control, admission control, congestion control, etc., and may lead to higher failure rates and inefficient resource utilization in the network.

Another problem is that there will be wireless devices with and without enhanced receivers in the same network. Thus, the reported interference may differ for different types of wireless devices in the same radio conditions. As such, if the network would become aware of the signal quality of a wireless having an enhanced receiver after interference handling and the signal quality of a wireless device without an enhanced receiver (or with an enhanced receiver with inactive interference handling), the signal qualities may mistakenly be interpreted by the network as different radio conditions and/or different wireless device locations. This would cause problems for, e.g., Self-Organizing Networks (SONs), Radio Resource Management (RRM), Minimization of Drive Tests (MDT), positioning, etc.

Another problem is that a wireless device having an enhanced receiver may not always apply an interference handling technique. This may result in a large variation of the signal quality when the same wireless device applies and does not apply an interference handling technique, which may cause problems for, e.g., mobility.

Yet another problem is that a wireless device with an enhanced receiver can report a quality measurement (e.g., Reference Signal Received Quality (RSRQ)) only after applying compensation to eliminate the suppressed interference. However, this may lead to more complex implementation in the wireless device. Furthermore, this may also delay the measurement report, which can adversely affect a mobility performance of the wireless.

The problems stated above may become particularly severe when the network is not aware of when a wireless device is applying the interference handling technique, e.g., when Common Reference Signal (CRS) interference cancellation is not restricted to subframes indicated for restricted measurements only. Thus, in a network with a mix of wireless devices with different receiver capabilities and in scenarios where the same wireless device may use enhanced receiver capabilities differently in different situations and over time, it becomes difficult for the network to discriminate among the measurements reported by wireless devices and for the wireless devices to support many types of measurements. As such, there is a need for systems and methods that address the aforementioned problems and/or other problems.

In this regard, systems and methods are disclosed herein that address the aforementioned problems. Note, however, that the embodiments disclosed herein are not to be limited by the problems discussed above. The problems above are to serve only as examples of problems that certain embodiments of the present disclosure can address.

More specifically, the present disclosure relates to effective measurements in a cellular communications network. Effective measurements are particularly beneficial in a cellular communications network having wireless devices, or other measuring nodes, equipped with enhanced receivers and, even more particularly, in cellular communications networks having a mixture of wireless devices, or other measuring nodes, with and without enhanced receivers and/or wireless devices, or other measuring nodes, with enhanced receivers where one or more interference handling techniques performed by the enhanced receivers are not always active (e.g., in order to reduce processing and/or power requirements). For instance, in one embodiment, a reference measurement performed by a measuring node equipped with an enhanced receiver while an interference handling technique is not applied may be converted into an effective measurement that more accurately reflects the actual conditions at the measuring node when the interference handling technique is applied.

Figure 3:
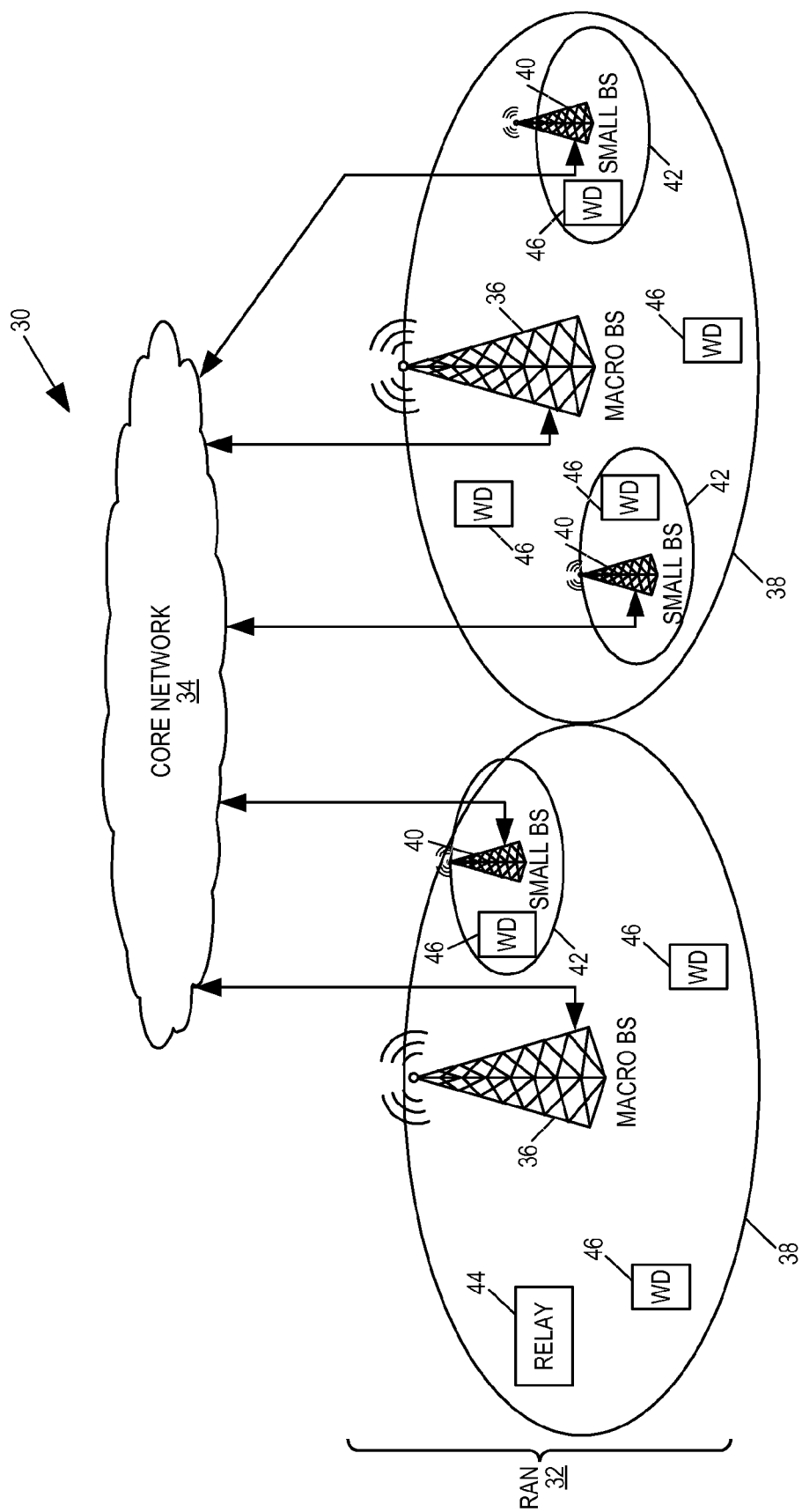
FIG. 3 illustrates a cellular communications network that enables effective measurements (e.g., effective signal quality measurements) according to one embodiment of the present disclosure.

FIG. 3 illustrates a cellular communications network 30 in which effective measurements are generated and used according to one embodiment of the present disclosure. Notably, in one preferred embodiment, the cellular communications network 30 is a 3GPP LTE or LTE-Advanced network and, as such, 3GPP LTE terminology is sometimes used herein. However, the concepts disclosed herein are not limited to LTE or LTE-Advanced.

As illustrated in FIG. 3, the cellular communications network 30 includes a Radio Access Network (RAN) 32 and a core network 34. The RAN 32 includes a heterogeneous deployment of base stations including a number of macro, or high-power, base stations 36 serving corresponding macro cells 38 and a number of small, or low power, base stations 40 serving corresponding small cells 42. In LTE, the macro base stations 36 are referred to as Evolved Node Bs (eNBs). The small base stations 40 may be referred to as Home eNBs (HeNBs), pico base stations (serving pico cells), femto base stations (serving femto cells), or the like. In general, the small base stations 40 are base stations having a transmit power that is substantially less than that of the macro base stations 36. In this embodiment, the RAN 32 also includes a relay 44. The RAN 32 operates to provide wireless access to a number of wireless devices 46 located in the macro cells 38 and the small cells 42. The wireless devices 46 may also be referred to as User Equipment devices (UEs), mobile terminals, mobile stations, or the like. Some exemplary wireless devices 46 include, but are not limited to, mobile phones, computers equipped with cellular network interfaces, tablet computers equipped with cellular network interfaces, or the like.

The base stations 36, 40 are connected to the core network 34. The core network 34 includes various nodes including, but not limited to, a Mobility Management Entity (MME), a Serving Gateway (S-GW), a Packet Data Network Gateway (P-GW), etc (not illustrated). The MME is the control-plane node of the core network 34. The MME operates to, among other things, control connection and release of bearers to the wireless devices 46, control IDLE to ACTIVE transitions, and handling of security keys. The S-GW is the user-plane node connecting the core network 34 to the RAN 32. The S-GW operates as a mobility anchor when terminals move between the base stations 36, 40 as well as a mobility anchor for other 3GPP technologies (Global System for Mobile Communications (GSM)/General Packet Radio Service (GPRS) and High Speed Packet Access (HSPA)). The P-GW connects the core network 34 to the Internet. In addition, the core network 34 includes other nodes such as, for example, a Policy and Charging Rules Function (PCRF) responsible for Quality of Service (QoS) handling and charging, a Home Subscriber Service (HSS) node, which is a database containing subscriber information, and nodes providing a Multimedia Broadcast Multicast Service (MBMS).

Before continuing with the description, a number of terms that are used throughout this description are defined as follows.

As used herein, a "radio node" is characterized by its ability to transmit and/or receive radio signals and it comprises at least one transmitting or receiving antenna. A radio node may be a wireless device or a radio network node.

The terms wireless device and UE are used interchangeably in this description. As used herein, a "wireless device" is any device equipped with a radio interface, or radio subsystem, and capable of at least transmitting or receiving a radio signal from another radio node. A wireless device may also be capable of receiving and demodulating a radio signal. Note that even some radio network nodes, e.g., a femto base station (aka a home base station), may also be equipped with a UE-like interface. Some examples of a wireless device that are to be understood in a general sense are a Personal Digital Assistant (PDA), laptop computer, mobile phone, a tablet computer or device, a sensor, a fixed relay, a mobile relay, or any radio network node equipped with a UE-like interface.

As used herein, a "radio network node" is a radio node in a radio communications network (e.g., a RAN of a cellular communications network). Thus, a radio network node may be, for example, a base station (e.g., a macro base station, e.g., an eNB, or a low power base station, e.g., a pico, femto, or HeNB), Remote Radio Head (RRH), Remote Radio Unit (RRU), a transmitting-only/receiving-only radio network node, a relay node, or a Location Management Unit (LMU). A radio network node may be capable of receiving radio signals or transmitting radio signals in one or more frequencies, and may operate in single-Radio Access Technology (inter-RAT), multi-RAT, or multi-standard mode (e.g., Multi-Standard Radio (MSR)). A radio network node may or may not create a corresponding cell. Some examples of radio network nodes not creating their own cells are beacon devices transmitting configured radio signals or measuring nodes receiving and performing measurements on certain signals (e.g., LMUs). A radio network node may also share a cell or cell Identifier (ID) with another radio network node that does create its own cell, operate in a cell sector, or be associated with a radio network node creating its own cell. More than one cell or cell sector (commonly named in the described embodiments by a generalized term "cell" which may be understood as a cell or its logical or geographical part) may be associated with one radio network node. Further, one or more serving cells (in downlink and/or uplink) may be configured for a wireless device, e.g., in a carrier aggregation system where a wireless device may have one Primary Cell (PCell) and one or more Secondary Cells (SCells). A cell may also be a virtual cell (e.g., characterized by a cell ID but not provide a full cell-like service) associated with a transmit node.

As used herein, a "network node" is a radio network node or core network node. Some non-limiting examples of a network node are a base station (also radio network node), Radio Network Controller (RNC), positioning node, MME, Public Safety Answering Point (PSAP), Self-Optimizing Network (SON) node, MDT node, coordinating node, a gateway node (e.g., P-GW or S-GW or LMU gateway or femto gateway), and an Operation and Management (O&M) node.

The term "coordinating node" used herein is a network node, which coordinates radio resources with one or more radio nodes. Some examples of the coordinating node are a network monitoring and configuration node, Operational Support System (OSS) node, O&M, MDT node, SON node, positioning node, MME, a gateway node such as P-GW or S-GW or femto gateway node, a macro base station coordinating smaller radio nodes associated with it, macro base station coordinating resources with other macro base stations, etc.

The term "subframe" used in the embodiments described herein (typically related to LTE) is an example resource in the time domain, and in general it may be any predefined time instance or time period.

The term "victim" may apply e.g. to a measured signal or a measured cell (depending on the context), the measurements of which are performed in high-interference conditions. The term "aggressor" may apply e.g. to a strongly interfering signal or a strongly interfering cell (depending on the context), which is the source of interference the victim. Some examples of victim-aggressor relations are: an LTE physical signal to an LTE physical signal (of the same or different type) or to an LTE physical channel, an LTE physical channel to an LTE physical channel (of the same or different type) or an LTE physical signal, a macro cell or wireless devices served by the macro cell causing interference to a pico cell or a wireless device served by the pico cell, a wireless device served by a femto cell or a Closed Subscriber Group (CSG) causing interference to a non-CSG cell or wireless device served by a non-CSG cell, or the like.

As used herein, an "enhanced receiver" is a receiver capable of performing one or more interference handling techniques (e.g., interference cancellation, interference suppression, interference rejection, etc.). In some embodiments, "receiver type" may be used interchangeably with "receiver technique." Herein, an interference handling/mitigating technique may comprise, e.g., any one or a combination of:
  Interference Cancellation (IC), e.g.:
    applied on a physical signal or channel, more specifically, e.g., on Primary Synchronization Signal (PSS), Secondary Synchronization Signal (SSS), CRS, Positioning Reference Signal (PRS), Physical Broadcast Channel (PBCH), Physical Downlink Control Channel (PDCCH), or Enhanced PDCCH (ePDCCH), etc.; or
    applied on an antenna or an antenna branch (e.g., cross polarization interference cancellation);
  Interference suppression (IS);
  Interference Rejection (IR);
  Selective interference filtering; or
  Puncturing or using soft weights (e.g., removing or weighting the interference on certain time and/or frequency resources such as subcarriers, resource elements, time-domain symbols, etc.).

As used herein, an "effective measurement" is a measurement accounting for interference and wherein the interference is accounted for by selectively mitigating at least one interference component, e.g., removing or compensating fully or partly some interference components (an interference component is interference that originates from a source of interference, e.g., a node, a signal, or receiver or transmitter imperfection). Some examples of effective measurements are an effective received signal quality measurement (e.g., an effective RSRQ measurement or an effective wideband RSRQ), an effective interference measurement (e.g., an effective RSSI measurement, an effective noise rise measurement, an effective noise floor measurement, or lo (which is the total received power density, including signal and interference, as measured at the UE antenna connector), an effective radio link quality measurement used for RLM, and an effective air interface load measurement. The effective measurement may be intra-frequency, inter-frequency, inter-Radio Access Technology (RAT), carrier aggregation measurement, etc. and it may be associated with any activity state of a wireless device (e.g., CONNECTED, IDLE, low-activity, low-power consumption, etc.), may be associated with a specific state of a wireless device (e.g., depending on the assistance data availability), or may be avoided or cannot be associated with a specific state (e.g., depending on the power consumption associated with the interference handling technique).

The effective measurement may be associated with a reference measurement. As used herein, a "reference measurement" is a measurement without accounting, and in some embodiments selectively accounting, for interference. Note that the effective measurement may be obtained in a node different from the node performing the reference measurement. The effective measurement may be obtained in a network node (may also be a radio network node), whereas the reference measurement may be obtained in a wireless device, a radio network node, or other measuring node.

As used herein, a "measuring node" is a node that performs a reference measurement. As such, a measuring node may be, for example, a wireless device (or UE) or a radio network node (e.g., an LMU).

Further, the signaling described herein is either via direct links or logical links (e.g., via higher layer protocols and/or via one or more network and/or radio nodes). For example, signaling from a coordinating node to a wireless device may also pass through another network node, e.g., a radio network node.

Also, as noted above, the present disclosure is not limited to LTE or LTE-Advanced. Rather, the concepts and embodiments described herein apply to any RAN, single- or multi-RAT. Some other RAT examples are Universal Mobile Telecommunications System (UMTS), HSPA, GSM, Code Division Multiple Access (CDMA) 2000, WiMAX, and WiFi. In addition, the concepts and embodiments disclosed herein may also be applied to multi-point transmission and/or reception systems, carrier aggregation systems, and multi-point carrier aggregation systems.

Figure 4:
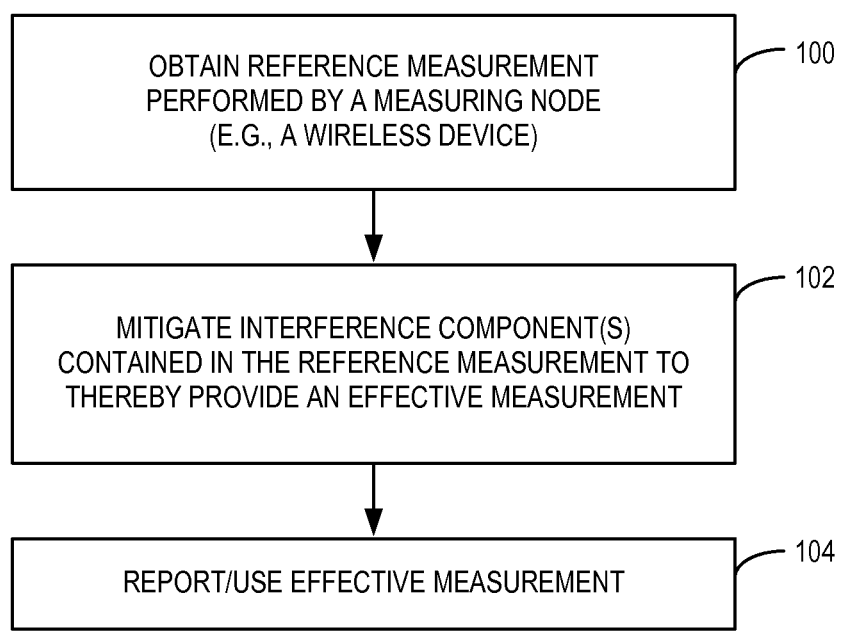
FIG. 4 is a flow chart that illustrates a process for generating an effective measurement and reporting and/or using the effective measurement according to one embodiment of the present disclosure.

Turning now to the operation of the cellular communications network 30 to provide and utilize effective measurements, FIG. 4 illustrates a process for generating and reporting and/or using an effective measurement according to one embodiment of the present disclosure. Note that while the embodiments discussed herein may focus on downlink measurements, the concepts disclosed herein are equally applicable to uplink measurements. This process is performed by a network node in the cellular communications network 30. The network node may be a network node in the core network 34 (e.g., a SON node, an OSS node, an MDT node, an O&M node, or other core network node) or a network node in the RAN 32 (e.g., a base station 36, 40, the relay 44, or a positioning node (e.g., LMU), or other radio network node). Note that while this process is preferably performed by a network node that is separate and distinct from a measuring node, this process may alternatively be performed by the measuring node (i.e., a reference measurement may be performed by a first function of the measuring node and an effective measurement may be obtained based on the reference measurement by a second function of the measuring node).

As illustrated, the network node obtains a reference measurement performed by a measuring node (step 100). The measuring node may be, for example, one of the wireless devices 46, a radio network node (e.g., one of the base stations 36, 40, or a LMU). In one embodiment, the network node obtains the reference measurement directly from the measuring node. In another embodiment, the network node obtains the reference measurement from another node that has obtained the reference measurement directly or indirectly from the measuring node (e.g., a wireless device that obtains the reference measurement from another wireless device via, for instance, D2D communication, a base station 36, 40 that obtains the reference measurement from a wireless device or LMU, a SON node, an MDT node, or the like). When the network node is a node other than the measuring node, the network node may receive the reference measurement directly from the measuring node (e.g., via direct signaling) or indirectly from the measuring node via another node. The network node may receive the reference measurement via Radio Resource Control (RRC), LTE Positioning Protocol (LPP), LTE Positioning Protocol A (LPPa), SLm Interface Application Protocol (SLmAP), X2, or another protocol, via a proprietary interface, or even via an internal interface (e.g., when the measuring node and the network node are the same node such as when, for example, the network node is an eNB and the measuring node is an LMU integrated into the eNB).

In one embodiment, the measuring node is one of the wireless devices 46, and the reference measurement is, for example, an RSRQ measurement, a wideband RSRQ measurement, a Signal-to-Interference Ratio (SINR) measurement, a Signal-to-Noise Ratio (SNR) measurement, some other received signal quality measurement, a RSSI measurement, an air interface load measurement, a noise rise measurement, a lo measurement, a noise floor measurement, a Channel Quality Indicator (CQI) measurement, a link quality measurement used for RLM, or some other interference measurement. Note that this list is only an example, and the reference measurement may alternatively be some other type of measurement. In another embodiment, the measuring node is a radio network node (e.g., a base station such as a Node B or eNB or an LMU), and the reference measurement is, for example, a received signal quality measurement, an air interface load measurement, a noise rise measurement, a lo measurement, a noise floor measurement, or some other interference measurement. Again, this list is only an example, and the reference measurement may alternatively be some other type of measurement.

The reference measurement contains one or more interference components. The reference measurement is a measurement on one cell (e.g., a serving cell of the measuring node where the measuring node is a wireless device), and the one or more interference components include inter-cell interference from a source(s) in one or more other cells (e.g., a wireless device in a neighboring macro or small cell or a base station of a neighboring macro or small cell). In addition, the one or more interference components may include interference from other sources (e.g., intra-cell interference, thermal noise, images, harmonics, interference due to a Carrier Aggregation (CA)-capable receiver or CA operation, etc.).

In one embodiment, the measuring node is not equipped with an enhanced receiver and, as such, the one or more interference components include all interference and noise from all sources including co-channel serving and non-serving cells, adjacent cell interference, thermal noise, etc. In another embodiment, the measuring node is equipped with an enhanced receiver that is capable of selectively applying one or more interference handling techniques. In particular, the interference handling technique(s) may be activated or deactivated under different conditions and/or for different time and/or frequency resources in order to, for example, reduce processing and/or power requirements. As such, if the interference handling technique(s) are active, or enabled, when performing the reference measurement, the enhanced receiver fully or partially removes at least some interference components and, as a result, the one or more interference components contained in the reference measurement are one or more residual interference components that were not removed or were only partially removed by the enhanced receiver. Conversely, if the interference handling technique(s) are not active when performing the reference measurement, the one or more residual interference components contained in the reference measurement are all interference components.

As an example, if the measuring node is one of the wireless devices 46 and the reference measurement is a measurement performed on one of the small cells 42, which can be either a serving or neighboring cell of the wireless device 46, the wireless device 46 may receive inter-cell interference from one or more aggressor cells (e.g., interference from one or more of the high power base stations 36). This interference may not be removed or may only be partially removed by an enhanced receiver of the wireless device 46. For instance, the wireless device 46 may not remove interference from reference signals (e.g., CRS, PSS/SSS, etc.) in the RSSI part of an RSRQ measurement. As a result, the RSRQ measurement (i.e., the reference RSRQ measurement) contains one or more residual interference components.

Thus, the one or more (residual) interference components contained in the reference measurement may include, for example: (a) co-channel interference of one or more signals (e.g., of CRS or PBCH signals from a known aggressor cell), (b) interference from other data transmissions, (c) adjacent channel interference, (d) noise caused by unwanted emissions from another node, (e) Radio Frequency (RF) image interference (e.g., in CA), (f) thermal noise, and/or (g) own signal interference contribution. In addition, the one or more interference components may be on specific time and/or frequency resources (e.g., in certain subframes, time symbols, frequency carrier, subcarriers, resource blocks, part of the bandwidth, resource elements, etc.).

After obtaining the reference measurement, the network node mitigates at least one of the one or more interference components contained in the reference measurement to thereby provide an effective measurement for the measuring node (step 102). Importantly, the interference mitigation is performed after the reference measurement is performed. In one embodiment, the effective measurement is of the same measurement type as the reference measurement. For example, if the reference measurement is the current LTE RSRQ measurement as defined in LTE Release 9 in 3GPP Technical Specification (TS) 36.214 v9.2.0, the effective measurement is then an effective RSRQ measurement. However, the effective measurement is not limited thereto. For instance, an effective RSSI measurement may be obtained from a reference RSRQ measurement, or both an effective RSSI measurement and an effective RSRQ measurement may be obtained from a reference RSRQ measurement.

Interference mitigation may be performed using any suitable technique. As discussed below, in one embodiment, interference mitigation is performed by applying a compensation value(s) to the reference measurement. The interference mitigation partially or fully removes some, if not all, of the interference components in the reference measurement. In one embodiment, the interference mitigation partially or fully removes interference component(s) from one or more aggressor cells. In addition, the interference may partially or fully remove any one or more of the remaining interference components (e.g., intra-cell interference, thermal noise, or the like).

In one embodiment, the one or more interference components contained in the reference measurement are one or more residual interference components resulting from the performance of the reference measurement when the interference handling technique(s) of the enhanced receiver were disabled. Further, in this embodiment, the amount of interference mitigation is, or is based on (e.g., a scaled version of), an amount of interference corresponding to a reference level that would have been mitigated by the enhanced receiver of the measuring node if the interference handling technique(s) of the enhanced receiver had been enabled when performing the reference measurement. This decreases the interference in the effective measurement, and as such, the effective measurement is a better representation of the measured parameter (e.g., RSRQ) at the measuring node. Note that if the measuring node is equipped with an enhanced receiver, duplicate interference removal should be avoided (i.e., the network node should only mitigate interference components that were not removed or not fully removed by the enhanced receiver of the measuring node).

In one embodiment, the effective measurement may be obtained for, or measured over, a specific bandwidth, e.g., channel bandwidth, measurement bandwidth, a configured bandwidth, a predefined bandwidth, a bandwidth defined by a predefined rule or a standard, over selected set of resource blocks, over selected part of the channel bandwidth (e.g., in upper 5 Megahertz (MHz) or lower 5 MHz). Further, the effective measurement may be obtained for, or performed on, a specific physical signal or channel. The effective measurement may be intra-frequency, inter-frequency, inter-RAT (e.g., it may be communicated to another RAT in step 104 discussed below), or intra- or inter-band measurement. The effective measurement may be a downlink or uplink measurement, or D2D measurement.

Once the effective measurement is obtained, the network node reports the effective measurement to another node (e.g., another network node in the RAN 32 or another RAN operating according to a different RAT) and/or uses the effective measurement at the network node (step 104). Note that step 104 is optional. The effective measurement may be utilized at the network node and/or some other network node for any desired action or purpose. Some examples are:

mobility (e.g., handover thresholds), admission/congestion control, or carrier switching in CA (see e.g. FIG. 6 discussed below),
    RLM, radio failure reporting,
    inter-cell interference coordination (e.g., Almost Blank Subframe (ABS) configuration, cell transmission or maximum power configuration, deciding the resource split between different transmissions, etc.),
    downlink or uplink power control,
    load estimation,
    downlink or uplink scheduling,
    link adaptation,
    receiver adaptation, wireless device power consumption management,
in-device co-existence interference management between a cellular system and in-device external wireless systems (e.g., configuring denial rate and/or denial subframes in which in-device external wireless systems can operate based on the effective measurement),
positioning (e.g., using the effective measurement for Enhanced Cell ID (E-CID), Adaptive Enhanced Cell ID (AECID), Radio Frequency Pattern Matching (RFPM), RF fingerprinting, hybrid positioning, dead reckoning, etc.),
MDT (e.g., using the effective measurement as a part of the MDT report),
SON (e.g., tuning of network parameters), and/or
collecting measurement statistics for observing network performance.

Note that while in one embodiment the network node that generates (i.e., performs) the effective measurement is separate and distinct from the measuring node, the present disclosure is not limited thereto. In another embodiment, the network node that generates the effective measurement and the measuring node are the same node. In this case, if the effective and reference measurements are performed in the same node, the receiver of that node may need to adapt (e.g., select the appropriate receiver type, receiver configuration, or receiver algorithm) depending on whether the reference or the effective measurement is performed. Also, a node capable of reporting a reference measurement and an effective measurement may need to adaptively decide which measurement is to be reported and when each type of measurement is to be reported.

Figure 5:
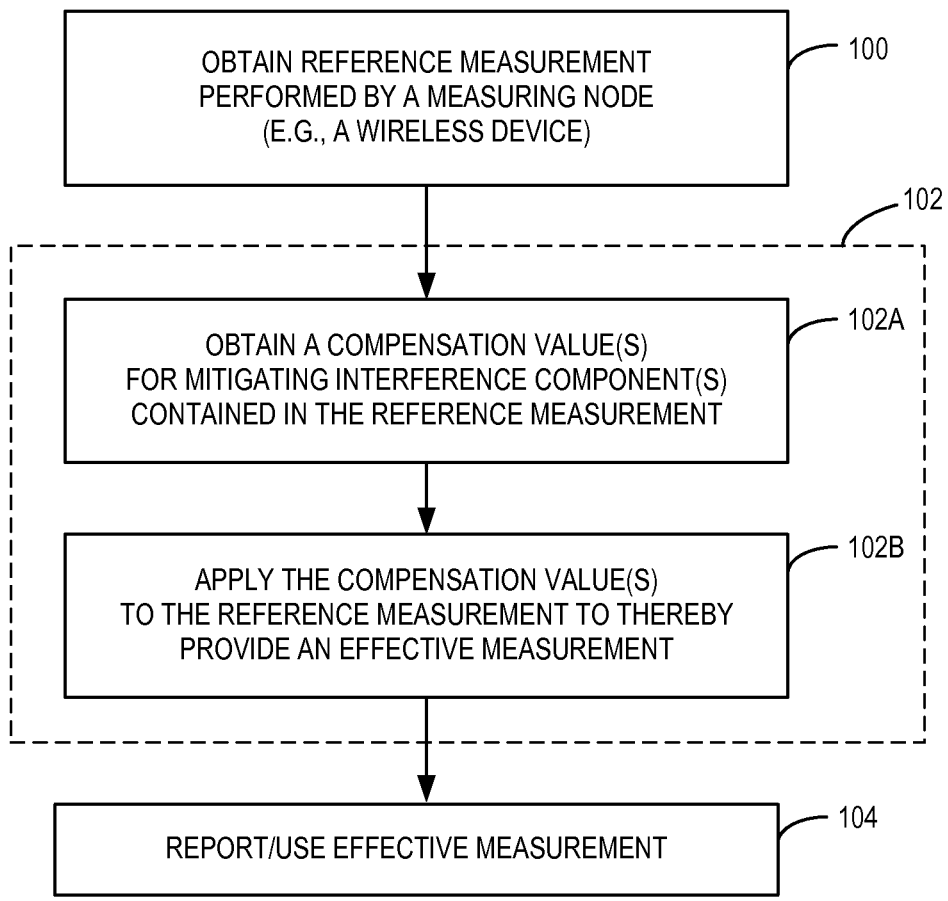
FIG. 5 is a flow chart that illustrates a process for generating an effective measurement and reporting and/or using the effective measurement according to one embodiment of the present disclosure.

FIG. 5 illustrates the process of FIG. 4 in more detail according to one embodiment of the present disclosure. In this embodiment, the network node mitigates the at least one of the one or more interference components contained in the reference measurement by applying a compensation value(s) to the reference measurement. More specifically, after obtaining the reference measurement in step 100, the network node obtains one or more compensation values for mitigating at least one of the interference components contained in the reference measurement (step 102A). The network node may obtain the compensation value(s) by determining the compensation value(s) locally at the network node or by obtaining the compensation value(s) from another node (e.g., another network node or the measuring node). The compensation value(s) may be expressed in terms of an amount, or magnitude, of interference that the enhanced receiver of the measuring node could have, but did not, mitigate when performing the reference measurement on a particular type of measuring channel or type of measuring signal. For example, the compensation value(s) may correspond to the amount of interference that the enhanced receiver of the measuring node could have, but did not, mitigate when performing the reference measurement or a scaled version thereof (e.g., scaling factor×the amount of interference that the enhanced receiver of the measuring node could have, but did not, mitigate when performing the reference measurement). The amount of compensation expressed by the compensation value(s) may be on a linear or logarithmic scale. Further, the amount of compensation expressed by the compensation value(s) may be a scaling factor, 0 decibels (dB), a positive number, a negative number, or the like. The compensation value(s) may include a single compensation value or multiple (i.e., a set) of compensation values (e.g., a set of compensation values including one compensation value per antenna port or stream).

The amount of interference, and thus the compensation value(s), may also depend upon radio characteristics, e.g., signal quality, radio conditions or type of radio channel, frequency band, bandwidth (e.g., channel bandwidth, measurement bandwidth or transmission bandwidth), receiving (e.g., the desired signal and interference plus noise) antenna ports and/or transmitting (e.g., interfering signals) antenna ports, transmit power or amount of power boosting of interfering signals, user speed or Doppler, etc. Therefore, the amount of compensation that the network node should apply may also depend upon similar radio characteristics. Thus, the network node (or other node) that determines the compensation value(s) may also determine or otherwise obtain one or more of these radio characteristics or configurations in order to determine or otherwise obtain the appropriate compensation value(s). This is illustrated with a few examples below:

In one example, a wireless device having an enhanced receiver may be capable of suppressing, reducing, or cancelling interference caused by an interfering signal (e.g., cell specific reference signal) from a neighboring cell to a received reference signal (e.g., CRS) from a serving cell of the wireless device by up to 8-10 dB provided that the SINR of the received reference signal is not lower than −10 dB and the delay spread of the radio channel is below 2 microseconds (μs). Thus, using the SINR of the received reference signal and the delay spread, the appropriate compensation value(s) can be selected.

In another example, a wireless device may be capable of suppressing the interference by up to 8-10 dB for frequency bands below 1 Gigahertz (GHz) and 5-8 dB for frequency bands above 2 GHz. Thus, using the frequency band of the signal measured for the reference measurement, the appropriate compensation value(s) can be selected.

The compensation value(s) may be obtained in any suitable manner. As one example, the compensation value(s) is determined by the network node. In another embodiment, the compensation value(s) is determined by another node (e.g., the measuring node) and provided to the network node. In one embodiment, the compensation value(s) are obtained based on data (e.g., the reference measurement or other measurements and/or data) received from the measuring node or another node, where the data may include the compensation value(s) (e.g., X dB) and/or a parameter that may be mapped to the compensation value(s) or used to derive the compensation value(s).

The compensation value(s) (which express the amount of compensation) may be determined by, for example:
using a predefined compensation value(s),
selecting the compensation value(s) from a predefined set of compensation values,
obtaining the compensation value(s) from a predefined mapping,
obtaining the compensation value(s) from a table,
acquiring the compensation value(s) from internal/external memory,
calculating the compensation value(s) by a predefined rule or using a predefined function, or
calculating the compensation value(s) based on collected measurement statistics in the same area as the measuring node (e.g., average or Z percentile of the collected differences between the effective and reference measurements).

Further, the compensation value(s) (or equivalently the amount of compensation expressed by the compensation value(s)) may be determined based on various types of information such as, for example, one or more of:

- a receiver type of the receiver of the measuring node (e.g., IC-capable receiver, puncturing receiver, CA-capable receiver, Interference Rejection Combining (IRC)-capable receiver, etc.),
- channel characteristics of a radio channel in which the effective measurement is applicable. The measurement value is influenced by the radio channel characteristics.
- measured signal bandwidth (e.g., RSRQ bandwidth or channel bandwidth for the wideband RSRQ),
- bandwidth used for interference estimate of the interference which is part of the measurement (e.g. RSSI in RSRQ),
- interference handling technique of the enhanced receiver of the measuring node (e.g., whether used or not and which one(s) if so),
- interference conditions (e.g., how much the aggressor cell is stronger than the measured cell, CRS Es/Iot or SCH Ec/Iot (i.e., terms used in LTE for SINR of CRS or SCH at the UE) of the measured signal, CRS Es/Noc or SCH Es/Noc (i.e., terms used in LTE for SNR of CRS or SCH at the UE) of the aggressor cell, SNR or Es/Noc of the measured cell),
- number of strong aggressor cells, e.g.:
  - the number or the set of cells is provided in the assistance data. The assistance data is data sent by the network node to the UE for assisting the UE in performing one or more radio measurements,
  - a predefined number according to a corresponding requirement, and
  - estimated or predicted number of cells whose signal strength is at least Y dB above the signal strength of the measured cell,
- signal strength of interfering signals (e.g., the wireless device (measuring node) may report Reference Signal Received Power (RSRP) of neighbor cells),
- CA configuration of the measuring node (e.g., type of CA such as inter-band, intra-band contiguous, intra-band non-contiguous, or any combination thereof),
- location of the wireless device,
- environment type and propagation (e.g., indoor/outdoor, urban/suburban/rural, line of sight/rich multipath, etc.),
- derived from another measurement, e.g., from CQI report,
- effective measurement purpose, e.g., mobility, positioning, MDT, SON, etc.,
- activity state associated with the effective measurement, wherein the activity state is the activity state (e.g., IDLE) of the node performing the reference measurement, e.g.:
  - 0 dB or a low amount of compensation may be predefined for effective measurements associated with the IDLE state or when the measuring wireless device is in a low activity state,
- frequency of measurement (e.g., level of compensation depending upon frequency band, carrier frequency, frequency below 1 GHz or above 2 GHz or between 1 and 2 GHz (e.g., larger level of compensation for higher band or frequency on which measurement is done)), and/or
- type of RAT (e.g., LTE Frequency Division Duplexing (FDD), LTE Time Division Duplexing (TDD), HSPA, etc.:
  - 0 dB or a low amount of compensation may be predefined for inter-frequency or inter-RAT effective measurements.

In one particular embodiment, the network node maintains a lookup table or similar data structure that maps compensation value(s) as a function of radio characteristics and/or configurations for different types of channels and physical signals. The data in the lookup table can be obtained based on explicit results in terms of the amount of interference suppressed by the enhanced receiver of the measuring node and/or other nodes having enhanced receivers (e.g., wireless devices 46 that are not the present measuring node) under different conditions. Alternatively, the network node can determine the compensation values for the different radio characteristics and/or configurations stored in the lookup table based on received measurements, e.g., by comparing received results of two sets of the same type of the measurements (one with interference handling technique(s) enabled and one with interference handling technique(s) disabled). In one example, the two sets may be performed by the measuring node for which the effective measurement is to be obtained. In another example, the two sets of measurements may be performed by other measuring nodes. Still further, each set of measurements may be performed by the same or different measuring nodes. The difference between the two sets may be collected as statistics to determine, e.g. an average or Xth percentile over measuring nodes (e.g., wireless devices) in similar conditions or in the same area.

In a more detailed example, the two measurements are performed with and without mitigating the interference. For example, the cellular communications network 30 can request the wireless device 46 (which in this example is the measuring node) to perform CQI1 and CQI2 with and without interference mitigation in different subframes. The difference in these results in log scale can depict the amount of the mitigated interference, which corresponds to the compensation under the conditions in which CQI1 and CQI2 are measured by the wireless device 46. In another example, the two sets may comprise RSRQ or total interference with and without interference mitigation. The network node may also apply a scaling factor to the determined differential value to provide the corresponding compensation value. In this way, the network node can build the lookup table and use the lookup table to obtain the appropriate compensation value(s) for mitigating interference component(s) contained in reference measurements performed by the wireless device 46. For example, the network node may obtain the determined compensation value for a reference RSRQ measurement performed by the wireless device 46 by using the lookup table.

Once the compensation value(s) are obtained, the network node applies the compensation value(s) to the reference measurement to thereby provide the effective measurement for the measuring node (step 102B). In one embodiment, the compensation value is such that the compensation is either subtracted from or added to the reference measurement to obtain the effective measurement. Further, in one embodiment, the compensation value is a single value that is applied (e.g., added to or subtracted from) the reference measurement. In another embodiment, the compensation value(s) includes multiple compensation values for different time and/or frequency resources and/or separate compensation values for each of multiple antenna ports or streams. For instance, multiple compensation values (which may be different values or the same value) may be applied to different time and/or frequency resources (e.g., completely remove interference on a subset of certain radio resources such as Resource Elements (REs) in a manner similar to a puncturing receiver). Using RSRQ as an example, RSRQ is based on RSSI, which is a linear average of the total received power observed on particular symbols within the measurement bandwidth over N resource blocks. Thus, RSSI consists of a number of sub-measurements of total received power for each observed symbol within the measurement bandwidth over the N resource blocks. Therefore, in one embodiment, the compensation value(s) include separate compensation values (which may be same or different values) for each sub-measurement. Lastly, as discussed above, the network node reports and/or uses the effective measurement (step 104). Again, note that step 104 is optional.

An example of how the network node can apply compensation to a reference measurement (e.g., RSRQ) performed by one of the wireless devices 46 will now be described. Note that this is just an example and is not to be construed as limiting the scope of the concepts and embodiments described herein. Consider that the wireless device 46 is using an enhanced receiver that performs CRS interference cancellation for cancelling CRS interference caused by the CRS of a neighbor cell to the CRS received from a measured cell. The wireless device 46 measures RSRP after applying CRS cancellation but measures carrier RSSI before CRS cancellation. The wireless device 46 obtains a reference RSRQ measurement (i.e., N*RSRP/carrier RSSI) in linear scale) and reports the reference RSRQ measurement to the cellular communications network 30. The cellular communications network 30 also obtains RSRP from the wireless device 46. The network node receives the reference RSRQ measurement directly or indirectly from the wireless device 46 and also determines that the wireless device 46 is using CRS cancellation and is operating under certain radio characteristics, e.g. band 8 (900 MHz), channel BW (10 MHz), etc. For example, the network node may know that when a wireless device capable of CRS IC is configured with a restricted measurement pattern, the wireless device is expected to use CRS IC interference cancellation on one or more neighboring CRS signals. The network node may obtain the amount of compensation (e.g., the compensation value) to be applied under the above conditions from, for example, a lookup table. The network node will then apply the compensation value to the reference RSRQ measurement as follows (in dB scale):

$$\text{Carrier\_RSSI}_1 = N + RSRP_{REPORTED} - RSRQ_{REFERENCE},$$

$$\text{Carrier\_RSSI}_2 = \text{Carrier\_RSSI}_1 - \beta,$$

$$RSRQ_{EFFECTIVE} = N + RSRP_{REPORTED} - \text{Carrier\_RSSI}_2$$
$$= N + RSRP_{REPORTED} - (\text{Carrier\_RSSI}_1 - \beta)$$

where $RSRP_{REPORTED}$ is the reported RSRP measured by the wireless device 46, $RSRQ_{REFERENCE}$ is the reference RSRQ measurement reported by the wireless device 46, $\beta$ is the compensation value, and $RSRQ_{EFFECTIVE}$ is the effective RSRQ measurement. Note that, in this example, a single compensation value is applied to the reference RSRQ measurement. However, in another embodiment, there may be separate compensation values for each RSSI sub-measurement/resource (i.e., there may be different compensation values for different time and/or frequency resources used for the reference measurement).

In one embodiment, the effective measurement is a measurement for the same time period (e.g., the same subframe) as the reference measurement. However, in another embodiment, the effective measurement is a predicted estimate. In particular, the effective measurement is a predicted estimate for a time $t_P$ based on the reference measurement for a time $t_R$, where $t_P > t_R$ (i.e., $t_P$ is after $t_R$ in time). Thus, as an example, the effective measurement may be a predicted estimate for a time period during which the interference handling technique(s) of the enhanced receiver of the measuring node are active that is generated based on the reference measurement performed during a time period during which the interference handling technique(s) are disabled. Similarly, in the embodiments of FIGS. 4 and 5, the reference measurement is an actual measurement performed by the measuring node. However, the reference measurement may alternatively be a predicted reference measurement that is predicted based on, for example, historical (i.e., previous) reference measurements performed by the measuring node, measurement statistics for historical measurements performed by the measuring node, historical reference measurements performed by other nodes, and/or measurement statistics for historical measurements performed by the other nodes.

Figure 6:
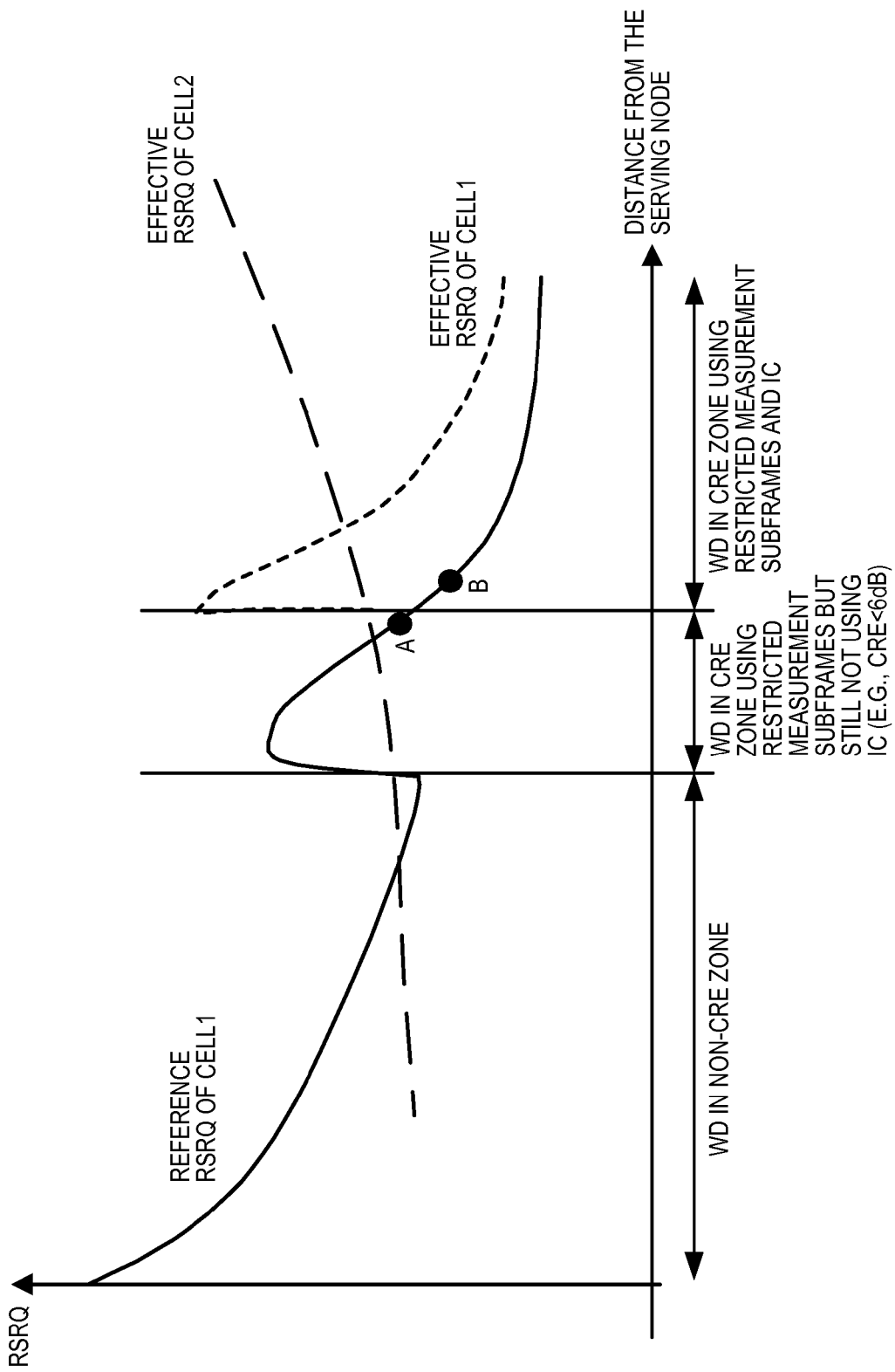
FIG. 6 illustrates one example of using reference and effective Reference Signal Received Quality (RSRQ) measurements according to one embodiment of the present disclosure.

With regard to predicted effective measurements, FIG. 6 illustrates one example of the use of a predicted effective measurement. Specifically, in order to determine whether to perform a handover of one of the wireless devices 46 from cell 1 to cell 2, the network node may need to predict ahead in time an effective RSRQ measurement for a wireless device 46 on cell 1 and, optionally, predict whether the wireless device 46 should or will use an interference handling technique. The network node may instruct the wireless device 46 to use an interference handling technique or otherwise indicate to the wireless device 46 that the wireless device 46 should use the interference handling technique if the predicted effective RSRQ measurement for cell 1 is better than that of cell 2.

Hence, as illustrated in FIG. 6, as the wireless device 46 moves to a point A near the edge of a Cell Range Expansion (CRE) zone, the network node predicts an effective RSRP measurement on cell 1 at a point B and/or predicts an effective RSRP measurement on cell 2 at a point B to determine whether to perform a handover of the wireless device 46 from cell 1 to cell 2 and, optionally, whether to trigger activation of an interference handling technique at the wireless device 46. The predicted RSRP measurement(s) may be generated by applying a compensation value(s) to reference RSRQ measurements on cell 1 and, optionally, cell 2. Alternatively, the RSRP measurement for cell 1 and/or cell 2 may be predicted.

Figure 7:
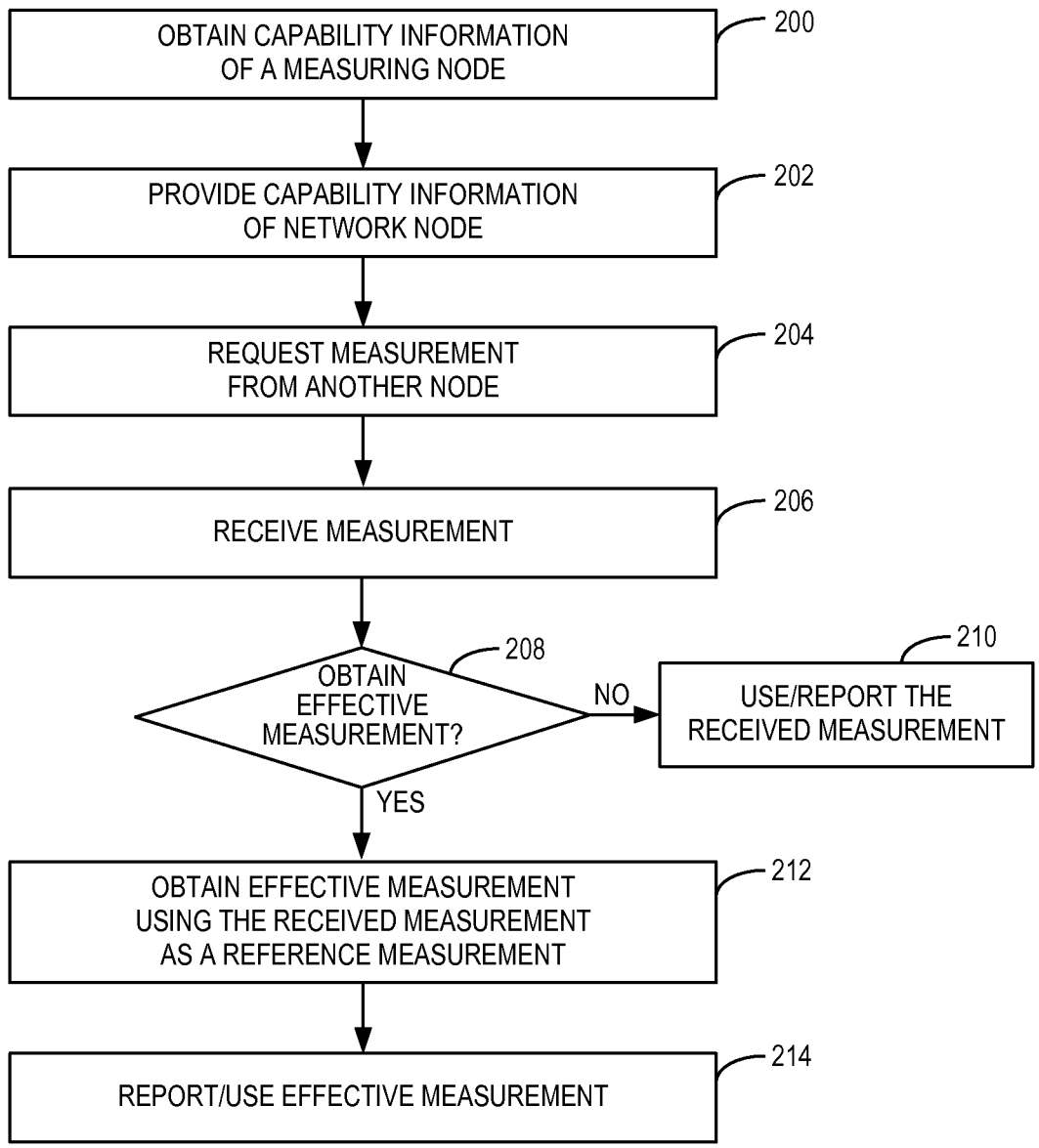
FIG. 7 is a flow chart that illustrates a process for selectively generating an effective measurement and reporting and/or using the effective measurement according to one embodiment of the present disclosure.

FIG. 7 illustrates a process for selectively generating an effective measurement according to one embodiment of the present disclosure. This process is preferably performed by a network node, as discussed above with respect to the embodiments of FIGS. 4 and 5. However, in an alternative embodiment, this process is performed by the measuring node (i.e., the effective measurement is generated at the measuring node). Optionally, the network node obtains capability information of a measuring node, provides its own capability information to another node (e.g., the measuring node), and requests a measurement from another node (e.g., the measuring node) (steps 200-204). Further, step 200 may be performed while step 202 is not performed and vice versa. In step 200, the capability information of the measuring node generally includes information that is indicative of the capabilities of the measuring node regarding effective measurements (e.g., information that is indicative of whether the measuring node is capable of generating an effective measurement from a reference measurement using, for example, any of the embodiments described above). Further, in step 200, the measuring node may be either a wireless device or a radio network node. Still further, if the measuring node is a wireless device, the capability information of the wireless device may be obtained from another network node (e.g., forwarded by an old serving base station to a new serving base station at handover or for some other reason). Additional details regarding the capability information is provided below in the discussion of FIG. 9. Likewise, the capability information of the network node includes information that is indicative of the capabilities of the network node regarding effective measurements. In one embodiment, the request of step 204 may be indicative of whether the network node desires a reference measurement or an effective measurement.

Whether or not steps 200-204 are performed, the network node receives a measurement performed by a measuring node (step 206). The measurement may be either a reference measurement or an effective measurement. The network node may receive the measurement directly from the measuring node or receive the measurement from a node other than the measuring node. In one embodiment, the measurement is received in a measurement report or a message. The measurement report or message may also be indicative (explicitly or implicitly) of whether the measurement is a reference measurement or an effective measurement. An explicit indication of whether the message is a reference measurement or an effective measurement may be, e.g., by signaling an indicator or using a specific message type or specific information element. The implicit indication of whether the message is a reference measurement or an effective measurement may be, e.g., by associating the measurement with a predefined rule or with specific time and/or frequency resources (e.g., any measurement which is performed in a certain measurement pattern is an effective measurement).

The network node then determines whether an effective measurement is to be obtained for the received measurement (step 208). Note that step 208 may not be performed in some embodiments (e.g., in an embodiment where the network node requests the desired type (i.e., reference or effective) of measurement. In one embodiment, the network node determines whether an effective measurement is to be obtained for the received measurement based on one or more of the following:

- a predefined rule and/or predefined conditions determining whether, when, and/or in what amount interference mitigation (e.g., compensation) should be applied, e.g.:
  - do not apply interference mitigation (e.g., compensation) to an effective measurement or if it is known (e.g., based on an indication or it has been determined) that interference mitigation (e.g., compensation) has already been applied by another node,
- a measurement performed based on restricted measurement pattern (which may sometimes be referred to as a Time Domain Measurement (TDM) pattern) is an effective measurement,
- a measurement of a certain type or a measurement on a certain physical signal is an effective measurement,
- a measurement performed in high-interference conditions (e.g., in a CRE zone or when the neighbor cell RSRP is above a threshold) is an effective measurement,
- a measurement performed in a low-activity state or low-power/energy-consuming state is not an effective measurement, and/or
- a measurement not performed in low-interference sub-frames is not an effective measurement, known capability of the measuring node or the node (or function) from which the measurement was obtained,
- a request associated with the measurement (e.g., an effective or reference measurement might be requested, or even both),
- a report type in which the measurement was obtained or the data comprised in the message (e.g., an explicit indication whether the reference or effective measurement is reported or whether the measurement is based on a pattern) in which the measurement was obtained, and/or
- discrimination (i.e., applying for some and not applying for others and/or applying higher interference mitigation (e.g., higher compensation) for some and applying lower interference mitigation (e.g., compensation) for others), e.g., between:
  - different measurement types (e.g., RSRQ, etc.),
  - different time and/or frequency resources associated with the measurement or the resources in which the measurement was performed or requested to be performed,
  - different types of wireless devices,
  - different receiver types (e.g., enhanced receivers and legacy receivers, receivers supporting IC and receivers not supporting IC, receivers supporting puncturing and receivers not supporting puncturing, receiver categories, etc.), and/or
  - different measurement purpose (e.g., mobility, positioning, etc.).

If an effective measurement is not to be obtained (e.g., a reference measurement is desired or the received measurement is already an effective measurement), the network node uses and/or reports the received measurement in a manner similar to that described above (step 210). Otherwise, if an effective measurement is to be obtained, the network node obtains an effective measurement using the received measurement as a reference measurement using any of the embodiments described above (step 212). As discussed above, in one embodiment, the effective measurement is obtained by applying a compensation value(s) to the reference measurement. Further, the compensation value(s) may be determined autonomously by the network node or based on data received from another node(s), wherein the data may include the amount of compensation or compensation value(s), an indication based on which compensation value(s) may be obtained, e.g. by mapping in a table, or one or more parameters or other measurements which may be used to derive or calculate the compensation value(s).

Using steps 208 and 212, interference mitigation (e.g., compensation value(s)) is selectively applied to the received measurement. The selectivity may be based on predefined or configured rule(s), e.g., always apply, selectively apply, or selectively apply in a specific way depending on conditions. Further, steps 208 and 212 apply interference mitigation (e.g., compensation) selectively among measurements, among measurement reports, among measuring nodes, and/or among the nodes from which the measurement as obtained. Further, the amount of interference mitigation (e.g., compensation) may be selectively chosen or determined, as discussed above. Once the effective measurement has been obtained, the network node then uses and/or reports the effective measurement, as described above (step 214). Note that step 214 is optional.

Figure 8:
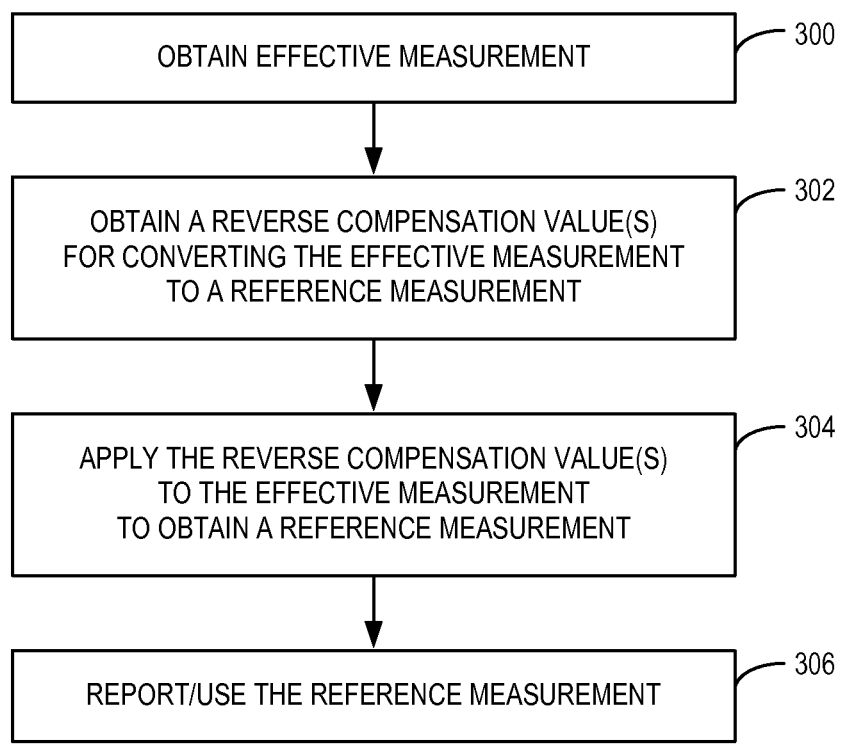
FIG. 8 is a flow chart that illustrates a reverse process for converting an effective measurement to a reference measurement and reporting and/or using the reference measurement according to one embodiment of the present disclosure.

In the embodiments of FIGS. 4-7, a reference measurement is converted to an effective measurement. FIG. 8 illustrates a reverse process in which an effective measurement is converted to a reference measurement according to another embodiment of the present disclosure. This process is performed by a node, e.g., one of the wireless devices 46 or a network node. In addition to being able to perform the reverse process of FIG. 8, the node may also be capable of performing the process of converting a reference measurement to an effective measurement as described above.

In some embodiments, a node (e.g., a network node) receives an effective measurement but desires a reference measurement instead of or in addition to the effective measurement. For example, the reference measurement may be desired to store in a database, apply in an RRM algorithm (e.g., power control or interference coordination), perform a network management task, or signal to another node. Such a need may also occur when a network node is not capable of handling an effective measurement. In this case, there may be a conversion function that converts the effective measurement to a reference measurement according to the process of FIG. 8. This conversion function or an associated conversion function at the node may also be capable of performing conversion of a reference measurement to an effective measurement as described above with respect to the embodiments of FIGS. 4-7. The reverse conversion from effective measurement to reference measurement may be applied, e.g., for incoming measurements (e.g., received from another node), and the conversion from reference measurement may be applied, e.g., for measurements performed by the node before signaling to another node or node function. Note, however, that the process of FIG. 8 is not limited thereto.

As illustrated in FIG. 8, the reverse conversion begins when the node (e.g., a network node) receives an effective measurement (step 300). The node may receive the effective measurement from another node (e.g., a wireless device or a network node). The node then converts the effective measurement into a reference measurement using, for example, the reverse of any of the embodiments of converting a reference measurement to an effective measurement described above. In this particular embodiment, in order to convert the effective measurement into a reference measurement, the node obtains a reverse compensation value(s) for converting the effective measurement to a reference measurement (step 302). In one embodiment, the reverse compensation value(s) are the inverse of a compensation value(s) applied to an original reference measurement to obtain the effective measurement (e.g., the additive inverse of a compensation value(s) added to or subtracted from the original reference measurement to obtain the effective measurement or a multiplicative inverse (or reciprocal) of a compensation value(s) with which the original reference measurement is multiplied or divided to obtain the effective measurement). The reverse compensation value(s) may be derived directly from the corresponding compensation values or may be obtained or determined using processes similar to those described above for obtaining and determining the compensation values. The reverse compensation value(s) can be obtained by the node using any of the embodiments described above (e.g., via a look-up table, computed via a predefined function or based on predefined rules, etc.).

The node then applies the reverse compensation value(s) to the effective measurement to thereby obtain a reference measurement (step 304). The node then reports and/or uses the reference measurement (step 306). Note that step 306 is optional. The node may report the reference measurement to some other node (e.g., a network node). In addition or alternatively, the node may use the reference measurement for any desired purpose such as, for example, those purposes given above for the effective measurement. The node may additionally or alternatively store the reference measurement for future use and/or reporting.

As mentioned above, the node may be capable of performing the reverse conversion process of FIG. 8 or capable of performing both the reverse conversion process of FIG. 8 and the conversion process for converting a reference measurement to an effective measurement. In this regard, the node may include hardware or a combination of hardware and software for performing one or both of these functions. The hardware may be, for example, a processor (e.g., a general purpose processor, a Digital Signal Processor (DSP), or an Application Specific Integrated Circuit (ASIC)) capable of executing instruction stored in memory or other computer readable medium.

Figure 9:
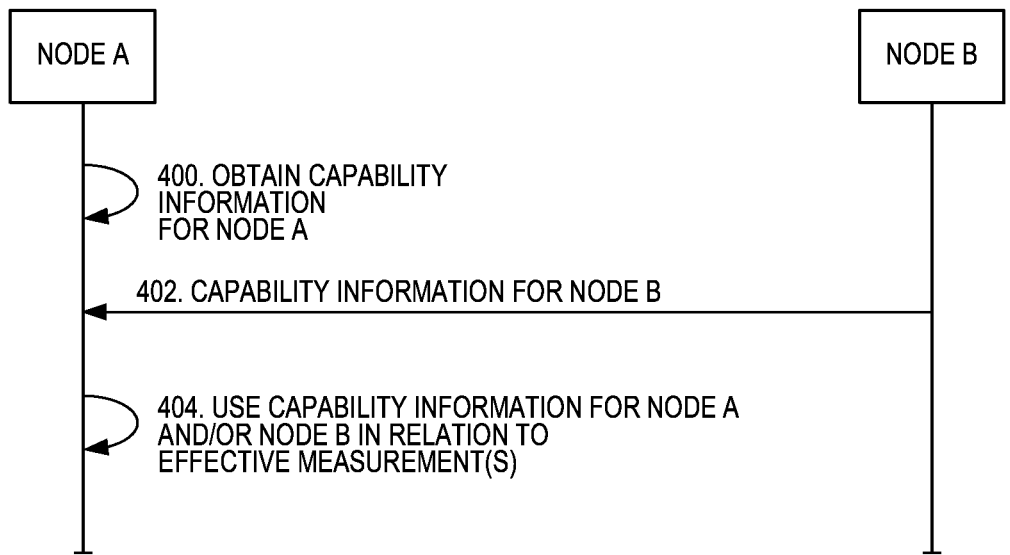
FIG. 9 illustrates the operation of two nodes in the cellular communications network of FIG. 3 to exchange capability information related to effective measurements according to one embodiment of the present disclosure.

In some of the embodiments above (e.g., the process of FIG. 7), capability information may be used. In this regard, FIG. 9 illustrates the operation of two nodes to exchange capability information related to effective measurements according to one embodiment of the present disclosure. The two nodes may be any two nodes (e.g., two wireless devices 46, two network nodes, a wireless device 46 and a network node, etc.). Note that while this capability information may be used in, for example, the selective generation of effective measurements, the present disclosure is not limited thereto. The capability information may be stored and/or used for any desired purpose.

As illustrated, a first node (node A) obtains capability information for itself (step 400). Node A may be any node (e.g., a network node or a wireless device 46). For example, node A may be an eNB, a Radio Base Station (RBS), a Multi-Standard Radio Base Station (MSR BS), an RNC, any radio network node, a core network node, a positioning node, an O&M node, a SON node, an MDT node, or a wireless device 46. The capability information includes information related to effective measurements. In one embodiment, the capability information includes one or more of the following:

information that is indicative of the capability of the node to request an effective measurement from another node, information that is indicative of the capability of the node to request compensation information from another node where the compensation information may contain compensation value(s) or information that is indicative of or that can be used to derive compensation value(s), information that is indicative of the capability of the node to obtain (e.g., determine compensation value(s), i.e., the amount of compensation), information that is indicative of the capability of the node to mitigate interference (e.g., apply a compensation value(s)) to measurement(s) to provide a corresponding effective measurement(s), information that is indicative of the capability of the node to mitigate interference (e.g., apply compensation value(s)) to a measurement selectively, information that is indicative of the capability of the node to indicate to another node that interference has been mitigated (e.g., compensation value(s) has been applied) for a measurement (i.e., that the measurement is an effective measurement), information that is indicative of the capability of the node to receive capability information of the measuring node indicative of whether the measuring node is capable of obtaining an effective measurement, and information that is indicative of the capability of the node to perform at least one of: direct or reverse conversion between a reference measurement and an effective measurement.

In this embodiment, another node, node B, sends capability information of node B and/or capability information of yet another node (node C) to node A (step 402). Node B may signal the capability information of node B and/or the capability information of node C to node A, e.g., upon a request, in response to a triggering event or condition, or in an unsolicited way. In one example, the signaling may be via X2 or RRC protocol, LPP protocol, LPPa protocol, or SLmAP protocol. Node B may be any other node (e.g., a network node or a wireless device 46). For example, node B may be an eNB, a RBS, an MSR BS, an RNC, any radio network node, a core network node, a positioning node, an O&M node, a SON node, an MDT node, or a wireless device. Note that while this embodiment includes both step 400 and 402, the present disclosure is not limited thereto. In some embodiments, only step 400 is performed. In another embodiment, only step 402 is performed.

Lastly, in this embodiment, node A uses the capability information of node A and/or the capability information of node B and/or node C in relation to one or more effective measurements (step 404). For example, node A may use the capability information of node A, node B, and/or node C to configure and/or request measurements from node B and/or node C, to signal the capability information of node A, node B, and/or node C (or some portion thereof) to another node, to coordinate with a measuring node to ensure interference mitigation (e.g., compensation) is performed only once, to decide how to process measurement(s) received from the node B and/or node C, to determine in which statistics reference and/or effective measurements should be included, and/or to determine how to request measurements from the node B and/or node C.

Figure 10:
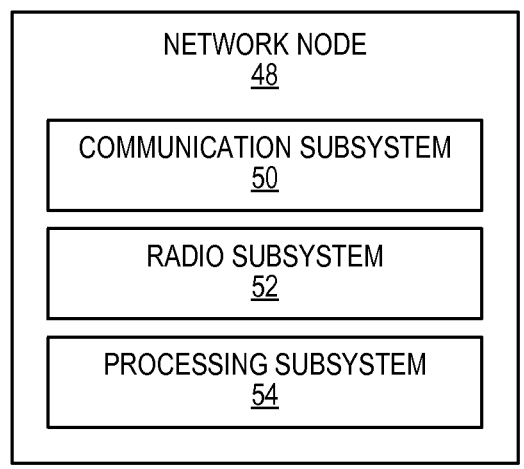
FIG. 10 is a block diagram of a network node in the cellular communications network of FIG. 3 according to one embodiment of the present disclosure.

FIG. 10 is a block diagram of a network node 48 according to one embodiment of the present disclosure. As illustrated, the network node 48 includes a communication subsystem 50, a radio subsystem 52 that includes one or more radio units (not shown), and a processing subsystem 54. The communication subsystem 50 generally includes analog and, in some embodiments, digital components for sending and receiving communications to and from other network nodes. The radio subsystem 52 generally includes analog and, in some embodiments, digital components for wirelessly sending and receiving messages to and from the wireless devices 46. Note that the radio subsystem 52 is not included in all network nodes. For instance, the radio subsystem 52 is included in network nodes in the RAN 32, but is not included in network nodes in the core network 34.

The processing subsystem 54 is implemented in hardware or in a combination of hardware and software. In particular embodiments, the processing subsystem 54 may comprise, for example, one or several general-purpose or special-purpose microprocessors or other microcontrollers programmed with suitable software and/or firmware to carry out some or all of the functionality of the network node 48 described herein. In addition or alternatively, the processing subsystem 54 may comprise various digital hardware blocks (e.g., ASICs, one or more off-the-shelf digital and analog hardware components, or a combination thereof) configured to carry out some or all of the functionality of the network node 48 described herein. Additionally, in particular embodiments, the above-described functionality of the network node 48 may be implemented, in whole or in part, by the processing subsystem 54 executing software or other instructions stored on a non-transitory computer-readable medium, such as Random Access Memory (RAM), Read Only Memory (ROM), a magnetic storage device, an optical storage device, or any other suitable type of data storage component.

Figure 11:
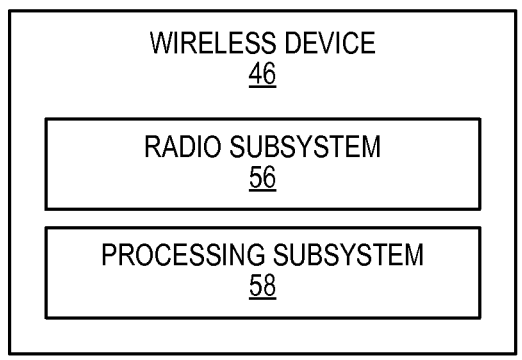
FIG. 11 is a block diagram of a wireless device in the cellular communications network of FIG. 3 according to one embodiment of the present disclosure.

FIG. 11 is a block diagram of one of the wireless devices 46 of FIG. 3 according to one embodiment of the present disclosure. As illustrated, the wireless devices 46 include a radio subsystem 56 that includes one or more radio units (not shown) and a processing subsystem 58. The radio subsystem 56 generally includes analog and, in some embodiments, digital components for wirelessly sending and receiving messages to and from the network nodes in the RAN 32 (e.g., the base stations 36, 40) and, in some embodiment, other wireless devices 46 (e.g., in the case of D2D communication).

The processing subsystem 58 is implemented in hardware or in a combination of hardware and software. In particular embodiments, the processing subsystem 58 may comprise, for example, one or several general-purpose or special-purpose microprocessors or other microcontrollers programmed with suitable software and/or firmware to carry out some or all of the functionality of the wireless devices 46 described herein. In addition or alternatively, the processing subsystem 58 may comprise various digital hardware blocks (e.g., one or more ASICs, one or more off-the-shelf digital and analog hardware components, or a combination thereof) configured to carry out some or all of the functionality of the wireless devices 46 described herein. Additionally, in particular embodiments, the above-described functionality of the wireless devices 46 may be implemented, in whole or in part, by the processing subsystem 58 executing software or other instructions stored on a non-transitory computer-readable medium, such as RAM, ROM, a magnetic storage device, an optical storage device, or any other suitable type of data storage component.

The following acronyms are used throughout this disclosure.

| | |
|---|---|
| 3GPP | 3$^{rd}$ Generation Partnership Project |
| μs | Microsecond |
| ABS | Almost Blank Subframe |
| AECID | Adaptive Enhanced Cell Identifier |
| ASIC | Application Specific Integrated Circuit |
| BCCH | Broadcast Control Channel |
| CA | Carrier Aggregation |
| CC | Component Carrier |
| CDMA | Code Division Multiple Access |
| CoMP | Coordinated Multi-Point |
| CPICH | Common Pilot Channel |
| CQI | Channel Quality Indicator |
| CRE | Cell Range Expansion |
| CRS | Cell-Specific Reference Signal |
| CSG | Closed Subscriber Group |
| CSI | Channel State Information |
| CSI-RS | Channel State Information-Reference Signal |
| D2D | Device-to-Device |
| DAS | Distributed Antenna System |
| dB | Decibel |
| DMRS | Demodulation Reference Signal |
| DRX | Discontinuous Reception |
| DSP | Digital Signal Processor |
| Ec | Energy per Chip |
| E-CID | Enhanced Cell Identifier |
| eICIC | Enhanced Inter-Cell Interference Coordination |
| eNB | Evolved Node B |
| E-UTRA | Evolved Universal Terrestrial Radio Access |
| FDD | Frequency Division Duplexing |
| GHz | Gigahertz |
| GPRS | General Packet Radio Service |
| GSM | Global System for Mobile Communications |

| | |
|---|---|
| HARQ | Hybrid Automatic Repeat Request |
| HeNB | Home Evolved Node B |
| HRPD | High Rate Packet Data |
| HSDPA | High Speed Downlink Packet Access |
| HSPA | High Speed Packet Access |
| HSS | Home Subscriber Service |
| IC | Interference Cancellation |
| ID | Identifier |
| IR | Interference Rejection |
| IRC | Interference Rejection Combining |
| IS | In-Sync |
| LTE | Long Term Evolution |
| LMU | Location Measurement Unit |
| LPP | Long Term Evolution Positioning Protocol |
| LPPa | Long Term Evolution Positioning Protocol A |
| MBMS | Multimedia Broadcast Multicast Service |
| MBSFN | Multicast-Broadcast Single-Frequency Network |
| MDT | Minimization of Drive Tests |
| MHz | Megahertz |
| MME | Mobility Management Entity |
| MMSE-IRC | Minimum Mean Square Error-Interference Rejection Combining |
| MMSE-SIC | Minimum Mean Square Error-Successive Interference Cancellation |
| ms | Microsecond |
| MSR | Multi-Standard Radio |
| No | Noise Spectral Density |
| O&M | Operation and Management |
| OFDM | Orthogonal Frequency Division Multiplexing |
| OOS | Out-Of-Sync |
| OSS | Operational Support System |
| PBCH | Physical Broadcast Channel |
| PCC | Primary Component Carrier |
| P-CCPCH | Primary Common Control Physical Channel |
| PCell | Primary Cell |
| PCFICH | Physical Control Format Indicator Channel |
| PCI | Physical Cell Identity |
| PCRF | Policy and Charging Rules Function |
| PDA | Personal Digital Assistant |
| PDCCH | Physical Downlink Control Channel |
| PDSCH | Physical Downlink Shared Channel |
| P-GW | Packet Data Network Gateway |
| PHICH | Physical Hybrid Automatic Repeat Request Indicator Channel |
| PMI | Precoder Matrix Indicator |
| PRS | Positioning Reference Signal |
| PSAP | Public Safety Answering Point |
| PSC | Primary Serving Cell |
| PSS | Primary Synchronization Signal |
| QoS | Quality of Service |
| RAM | Random Access Memory |
| RAN | Radio Access Network |
| RAT | Radio Access Technology |
| RBS | Radio Base Station |
| RE | Resource Element |
| RF | Radio Frequency |
| RFPM | Radio Frequency Pattern Matching |
| RI | Rank Indicator |
| RLF | Radio Link Failure |
| RLM | Radio Link Management |
| RNC | Radio Network Controller |
| ROM | Read Only Memory |
| RRC | Radio Resource Control |
| RRH | Remote Radio Head |
| RRM | Radio Resource Management |
| RRU | Remote Radio Unit |
| RSCP | Received Signal Code Power |
| RSRP | Reference Signal Received Power |
| RSRQ | Reference Signal Received Quality |
| RSSI | Received Signal Strength Indicator |
| RTT | Round Trip Time |
| Rx | Receive |
| SCC | Secondary Component Carrier |
| SCell | Secondary Cell |
| S-GW | Serving Gateway |
| SINR | Signal-to-Interference Ratio |
| SLmAP | SLm Interface Application Protocol |
| SNR | Signal-to-Noise Ratio |
| SON | Self-Optimized Network |
| SPICH | Secondary Pilot Channel |
| SSC | Secondary Serving Cell |
| SSS | Secondary Synchronization Signal |
| TDD | Time Division Duplexing |
| TDM | Time Domain Measurement |
| TS | Technical Specification |
| Tx | Transmit |
| UE | User Equipment |
| UMTS | Universal Mobile Telecommunications System |
| UTRA | Universal Terrestrial Radio Access |
| WCDMA | Wideband Code Division Multiple Access |

Those skilled in the art will recognize improvements and modifications to the preferred embodiments of the present disclosure. All such improvements and modifications are considered within the scope of the concepts disclosed herein and the claims that follow.

What is claimed is:

1. A method of operation of a network node in a cellular communications network, comprising:
obtaining a reference measurement performed by a measuring node, the reference measurement comprising a first parameter and containing one or more interference components;
obtaining a compensation value for mitigating at least one interference component of the one or more interference components contained in the reference measurement; and
applying the compensation value to the reference measurement to thereby mitigate the at least one interference component of the one or more interference components contained in the reference measurement and provide an effective measurement of the first parameter for the measuring node, wherein the reference measurement is for a first time, and the effective measurement is for a second time that is subsequent to the first time.

2. The method of claim 1 wherein the measuring node is a wireless device, the network node is a serving base station of the wireless device in the cellular communications network, and obtaining the reference measurement comprises receiving the reference measurement from the wireless device.

3. The method of claim 1 wherein the measuring node is a wireless device, and obtaining the reference measurement comprises receiving the reference measurement from a second network node.

4. The method of claim 1 wherein:
the measuring node is a wireless device;
the wireless device is equipped with an enhanced receiver capable of mitigating interference at the wireless device such that the one or more interference components contained in the reference measurement performed by the wireless device are one or more residual interference components; and
the at least one interference component mitigated by applying the compensation value comprises at least one residual interference component of the one or more residual interference components contained in the reference measurement.

5. The method of claim 4 wherein the reference measurement is on a first cell, and both the one or more residual interference components contained in the reference measurement and the at least one residual interference component mitigated to provide the effective measurement comprise one or more residual interference components received from at least one second cell.

6. The method of claim 5 wherein the compensation value is based on a reference value that is indicative of an amount of residual interference that can be mitigated by the enhanced receiver of the wireless device.

7. The method of claim 5 wherein the compensation value is based on one or more previous measurements performed by the wireless device.

8. The method of claim 5 wherein the compensation value is based on at least one of a group consisting of: measurement statistics for a plurality of previous measurements performed by a plurality of wireless devices and historical data for a plurality of previous measurements performed by a plurality of wireless devices.

9. The method of claim 5 wherein the compensation value is based on at least one of a group consisting of: a reference measurement performed by a second wireless device and a reference value that is indicative of an amount of residual interference that can be mitigated by an enhanced receiver of the second wireless device.

10. The method of claim 5 wherein the compensation value is a predefined compensation value.

11. The method of claim 5 wherein the compensation value is selected from a predefined set of compensation values.

12. The method of claim 5 wherein obtaining the compensation value comprises obtaining the compensation value from a second network node.

13. The method of claim 5 wherein obtaining the compensation value comprises determining the compensation value at the network node.

14. The method of claim 13 wherein determining the compensation value comprises determining the compensation value based on a receiver type of a receiver of the wireless device.

15. The method of claim 13 wherein determining the compensation value comprises determining the compensation value based on a bandwidth of a signal measured at the wireless device to perform the reference measurement.

16. The method of claim 13 wherein determining the compensation value comprises determining the compensation value based on a bandwidth of signals used for interference estimation.

17. The method of claim 13 wherein determining the compensation value comprises determining the compensation value based on one or more interference conditions at the wireless device.

18. The method of claim 13 wherein determining the compensation value comprises determining the compensation value based on a number of aggressor cells at the wireless device.

19. The method of claim 1 further comprising:
  determining whether an effective measurement is to be obtained; and
  in response to determining that an effective measurement is to be obtained, applying the compensation value to the reference measurement to thereby mitigate the at least one interference component and provide the effective measurement for the measuring node.

20. The method of claim 19 wherein determining whether an effective measurement is to be obtained comprises determining whether an effective measurement is to be obtained based on a restricted measurement pattern utilized by the measuring node in association with the reference measurement.

21. The method of claim 19 wherein determining whether an effective measurement is to be obtained comprises determining whether an effective measurement is to be obtained based on whether the measuring node performed the reference measurement using resources indicated in a restricted measurement pattern.

22. The method of claim 19 wherein determining whether an effective measurement is to be obtained comprises determining whether an effective measurement is to be obtained based on a restricted measurement pattern utilized by the measuring node in association with the reference measurement.

23. The method of claim 19 wherein determining whether an effective measurement is to be obtained comprises determining whether an effective measurement is to be obtained based on one or more high-interference conditions under which the measuring node performed the reference measurement.

24. The method of claim 19 wherein determining whether an effective measurement is to be obtained comprises determining whether an effective measurement is to be obtained based on known capability information of the measuring node.

25. The method of claim 24 wherein the known capability information is indicative of the reference measurement being a reference measurement rather than an effective measurement.

26. The method of claim 19 wherein:
  obtaining the reference measurement comprises receiving the reference measurement from a second network node; and
  determining whether an effective measurement is to be obtained comprises determining whether an effective measurement is to be obtained based on known capability information for the second network node from which the reference measurement was received.

27. The method of claim 26 wherein the known capability information is indicative of the reference measurement being a reference measurement rather than an effective measurement.

28. The method of claim 19 wherein:
  obtaining the reference measurement comprises receiving a report including the reference measurement; and
  determining whether an effective measurement is to be obtained comprises determining whether an effective measurement is to be obtained based on a report type of the report including the reference measurement.

29. The method of claim 1 further comprising:
  performing a desired action based on the effective measurement.

30. The method of claim 29 wherein the measuring node is a wireless device, and the desired action is an action related to mobility of the wireless device.

31. The method of claim 29 wherein the desired action is an action related to radio link monitoring.

32. The method of claim 29 wherein the desired action is an action related to positioning of a wireless device.

33. The method of claim 29 wherein the desired action is an action related to a Self-Organizing Network, SON.

34. The method of claim 1 wherein:
  obtaining the reference measurement comprises receiving the reference measurement from a second network node; and
  the method further comprises receiving capability information related to effective measurements from the second network node.

35. The method of claim 34 wherein the capability information comprises at least one of a group consisting of:
- information that is indicative of whether the second network node is capable of requesting an effective measurement from another network node;
- information that is indicative of whether the second network node is capable of requesting compensation information from another network node;
- information that is indicative of whether the second network node is capable of obtaining a compensation value;
- information that is indicative of whether the second network node is capable of applying a compensation value to a reference measurement to provide an effective measurement;
- information that is indicative of whether the second network node is capable of selectively applying a compensation value to a reference measurement to provide an effective measurement;
- information that is indicative of whether the second network node is capable of indicating to another network node whether a measurement is a reference measurement or an effective measurement;
- information that is indicative of whether the second network node is capable of receiving capability information of the measuring node that is indicative of whether the measuring node is capable of obtaining an effective measurement; and
- information that is indicative of whether the second network node is capable of performing at least one of a group consisting of: conversion of a reference measurement to an effective measurement and conversion of an effective measurement to a reference measurement.

36. The method of claim 1 wherein:
the measuring node is a wireless device;
obtaining the reference measurement comprises receiving the reference measurement from the wireless device; and
the method further comprises receiving capability information related to effective measurements from the wireless device.

37. The method of claim 36 wherein the capability information comprises at least one of a group consisting of:
- information that is indicative of whether the wireless device is capable of requesting compensation information from another network node;
- information that is indicative of whether the wireless device is capable of obtaining a compensation value;
- information that is indicative of whether the wireless device is capable of applying a compensation value to a reference measurement to provide an effective measurement;
- information that is indicative of whether the wireless device is capable of selectively applying a compensation value to a reference measurement to provide an effective measurement;
- information that is indicative of whether the wireless device is capable of indicating to another network node whether a measurement is a reference measurement or an effective measurement; and
- information that is indicative of whether the wireless device is capable of performing at least one of a group consisting of: conversion of a reference measurement to an effective measurement and conversion of an effective measurement to a reference measurement.

38. The method of claim 1 further comprising:
sending capability information related to effective measurements to another network node.

39. The method of claim 1 further comprising:
sending capability information related to effective measurements to another network node.

40. A network node for a cellular communications network, comprising:
- a communication interface configured to communicatively couple the network node to one or more other network nodes;
- a radio subsystem configured to provide wireless communication in the cellular communications network; and
- a processing subsystem associated with the communication interface and the radio subsystem, the processing subsystem being configured to:
  - obtain a reference measurement performed by a wireless device, the reference measurement comprising a first parameter and containing one or more interference components;
  - obtain a compensation value for mitigating at least one interference component of the one or more interference components contained in the reference measurement; and
  - apply the compensation value to the reference measurement to thereby mitigate the at least one interference component of the one or more interference components contained in the reference measurement and provide an effective measurement of the first parameter for the wireless device, wherein the reference measurement is for a first time, and the effective measurement is for a second time that is subsequent to the first time.

41. The method of claim 1 wherein the reference measurement comprises a measurement of power, quality, noise, or load of a signal or link.

42. The method of claim 40 wherein the reference measurement comprises a measurement of power, quality, noise, or load of a signal or link.

* * * * *

UNITED STATES PATENT AND TRADEMARK OFFICE
CERTIFICATE OF CORRECTION

PATENT NO. : 9,503,216 B2
APPLICATION NO. : 14/068159
DATED : November 22, 2016
INVENTOR(S) : Siomina et al.

It is certified that error appears in the above-identified patent and that said Letters Patent is hereby corrected as shown below:

In the Claims

In Column 38, Line 50, in Claim 42, delete "method" and insert -- network node --, therefor.

Signed and Sealed this
Seventeenth Day of January, 2017

Michelle K. Lee
*Director of the United States Patent and Trademark Office*